(12) United States Patent
Perkins et al.

(10) Patent No.: US 8,111,685 B2
(45) Date of Patent: Feb. 7, 2012

(54) COMMUNICATION NETWORK WITH CO-ROUTED MULTI-CHANNEL TRAFFIC

(75) Inventors: Drew D. Perkins, Saratoga, CA (US); David F. Welch, Atherton, CA (US); Ting-Kuang Chiang, Saratoga, CA (US); Edward E. Sprague, Woodside, CA (US); Parthiban Kandappan, San Jose, CA (US); Stephen G. Grubb, Reisterstown, MD (US); Prasad Paranjape, Fremont, CA (US)

(73) Assignee: Infinera Corporation, Sunnyvale, CA (US)

( * ) Notice: Subject to any disclaimer, the term of this patent is extended or adjusted under 35 U.S.C. 154(b) by 1027 days.

(21) Appl. No.: 11/851,349

(22) Filed: Sep. 6, 2007

(65) Prior Publication Data

US 2009/0052892 A1    Feb. 26, 2009

Related U.S. Application Data

(60) Provisional application No. 60/885,832, filed on Jan. 19, 2007.

(51) Int. Cl.
*H04L 12/28* (2006.01)

(52) U.S. Cl. .................................. 370/351; 370/535

(58) Field of Classification Search .................. None
See application file for complete search history.

(56) References Cited

U.S. PATENT DOCUMENTS

| | | | |
|---|---|---|---|
| 6,574,699 B1 * | 6/2003 | Dobbek | 711/4 |
| 6,667,993 B1 * | 12/2003 | Lippett et al. | 370/509 |
| 7,583,661 B2 * | 9/2009 | Chaudhuri | 370/353 |
| 2003/0142772 A1 * | 7/2003 | Weiss et al. | 375/372 |
| 2004/0105136 A1 * | 6/2004 | Feinberg | 359/20 |
| 2005/0117562 A1 * | 6/2005 | Wrenn | 370/351 |
| 2007/0147434 A1 * | 6/2007 | Toyoda | 370/503 |
| 2008/0175589 A1 * | 7/2008 | Perkins et al. | 398/34 |

* cited by examiner

*Primary Examiner* — Phirin Sam
(74) *Attorney, Agent, or Firm* — North Weber & Baugh LLP; David L. Soltz

(57) ABSTRACT

Embodiments of the present invention route a wavelength division multiplexed signal across multiple communication paths using skew characteristics of at least some of the communication paths. The network is a wavelength division multiplexed optical transport network. The plurality of communication paths involves different signal and path attributes such as a plurality of carrier wavelengths, optical carrier groups, physical communication paths (different nodes, different fibers along a same path, or any combination of the foregoing), or any other differentiating factors between two paths.

30 Claims, 19 Drawing Sheets

COMMUNICATION NETWORK WITH CO-ROUTED MULTI-CHANNEL TRAFFIC

CROSS REFERENCE TO RELATED PATENT APPLICATIONS

This application is related to U.S. Provisional Application Ser. No. 60/885,832, entitled "Communication Network with Skew Path Factoring," filed Jan. 19, 2007 and U.S. application Ser. No. 11/781,912, filed on Jul. 23, 2007 entitled "Communication Network with Skew Path Monitoring and Adjustment," both of which are incorporated herein by reference in their entirety.

BACKGROUND

A. Technical Field

This invention relates generally to optical transport networks, and more particularly to the management of skew across a wave division multiplexed network.

B. Background of the Invention

Optical networks are able to communicate information at high data rates. An optical transport system 10 is shown in FIG. 1, with multiple intermediate nodes and routes 16 between source 12 and destination 14. Nodes n1-n6 in a network are provided as an exemplary network with spatial diversity in the span, or segments separating nodes, e.g., across a geographic area. Multiple communication paths between a source node and destination node are provided across the network. The transport system might consider the route length, the traffic load, the route cost, and latency property, among other factors, for a given signal when choosing a path within the network on which to transport the signal. For example, a high quality of service ("QoS") request might require a given signal be transported on a route between a source and a destination with the lowest amount of latency. Alternatively, as traffic data rates continue to mushroom, carriers typically resort to routing signals on alternative and/or relatively higher latency paths, which often times span a longer overall distance than the preferred path. Additionally, these longer paths typically have more nodes, which usually translates into compromised timing properties for the signal at the receiver.

SUMMARY OF THE INVENTION

Embodiments of the present invention route a signal as signal portions over multiple paths in an optical network using skew characteristics of at least some of the communication paths. The network can be a wave division multiplexed ("WDM") optical transport network using wavelength division multiplexed wavelengths and/or optical carrier groups ("OCGs") over a fiber link to another node in the network. The plurality of communication paths involves different signal and path attributes such as a plurality of carrier wavelengths, optical carrier groups, physical communication paths (different nodes, different fibers along a same path, or any combination of the foregoing), or any other differentiating factors between two paths.

In certain embodiments of the invention, communication paths are selected relative to an analysis of skew on one or more of the selected communication paths and corresponding wavelengths. The associated information is routed on a path or paths with a minimum skew so that the sequential arrival of the information at a receiver is improved. Accordingly, the transmission of the associated information on the communication path(s) is controlled so that reassembly of the information becomes more efficient due to the relative arrival of portions of the information from a network to the receiver. The transmission of the associated information may be done as a virtual super wavelength or as a plurality of super wavelength groups.

In some embodiments, latency information is stored and maintained in a look-up table. The latency information can be used to estimate the skew between two network paths.

In certain other embodiments of the invention, a path with a preferred minimum skew is not available and an alternate routing is performed. In some embodiments, the signal may be unable to be co-routed on multiple paths and a notification is sent indicating that co-routing is unavailable at that time.

In other embodiments, a failure event has occurred and protection switching is performed taking into consideration the skew of the path switched to as a result of the failure event.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 7 is a flowchart of a process to empirically measure the skew of information transmitted by multiple communication paths in a communication network, in accordance with various aspects of the present invention.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Figure 2:
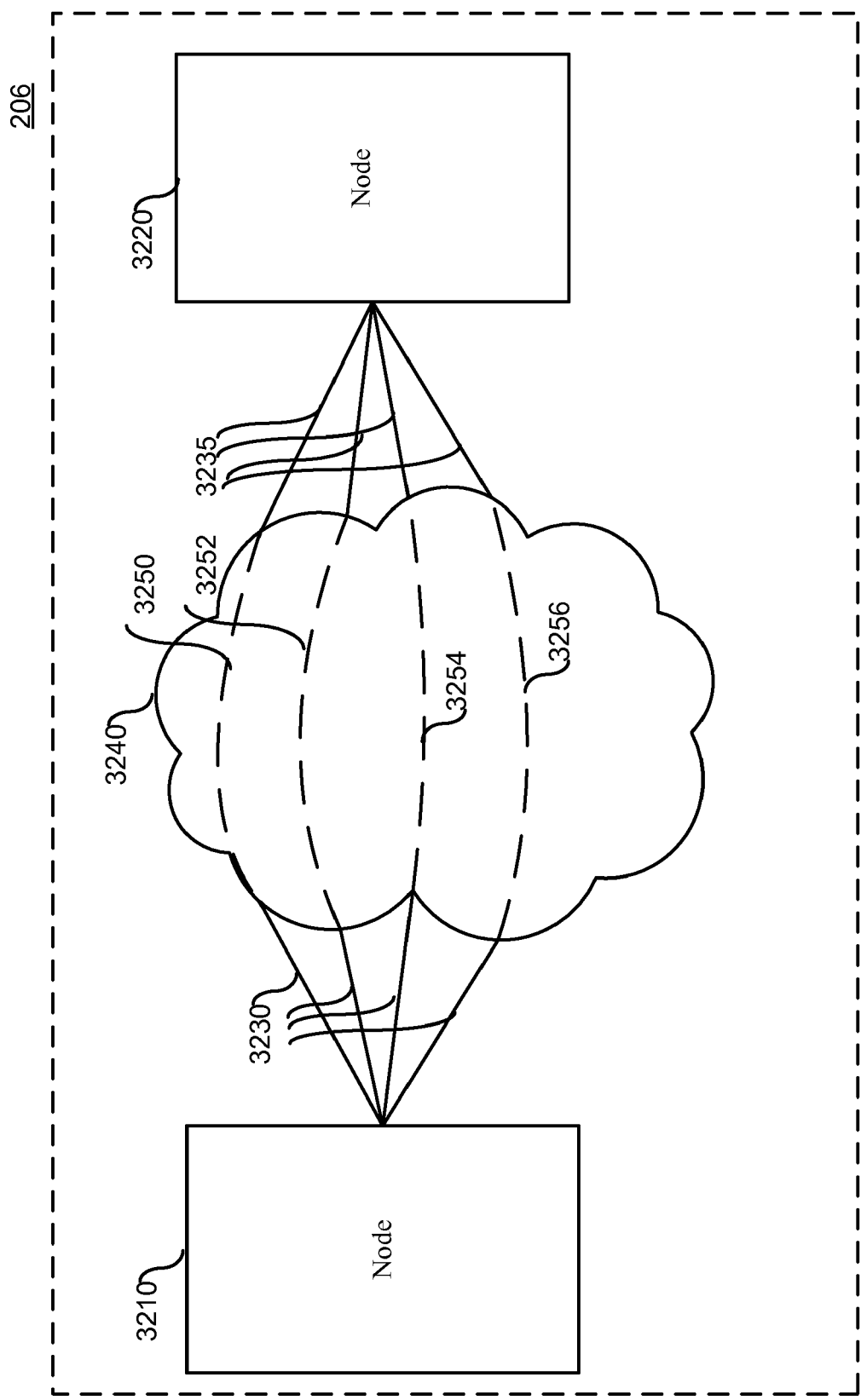
FIG. 2 is a block diagram of a communication network that transmits a signal over multiple channels considering skew information for routing the multiple channels, in accordance with various aspects of the present invention.

FIG. 2 illustrates a portion of an exemplary networking system where communication bandwidth and Quality of Service ("QoS") can be increased by transporting information, such a client signal, over multiple communication paths within the network system. Information is any data, such as content, control, overhead, metadata, redundant or protection data, correction data, etc. that is transported along a path in the network.

The portion of the networking system shown in FIG. 2 can, in various embodiments, incorporate portions of legacy communication networks along with additional control, methods and/or apparatus to enable the measurement, control, and/or adjustment of skew on the communication network as described in the present disclosure. A node in the networking system can be any node where transmitted information is managed, processed and/or signal performance is evaluated via measurement devices.

In accordance with certain embodiments of the invention, nodes can be traditional analog nodes, digital nodes, hybrid nodes that allow signal management, or any combination thereof. Analog nodes may be amplifiers, or regeneration nodes. Nodes can also be digital nodes, implementing an optical to electrical to optical translation ("OEO") such as described in case as disclosed and taught in U.S. patent application Ser. No. 10/267,331, filed Oct. 8, 2003, entitled "TRANSMITTER PHOTONIC INTEGRATED CIRCUITS (TxPIC) AND OPTICAL TRANSPORT NETWORKS EMPLOYING TxPICs" and in U.S. patent application Ser. No. 10/267,212, filed Oct. 8, 2002, entitled "DIGITAL OPTICAL NETWORK ('DON') ARCHITECTURE", and U.S. Pat. No. 7,116,851, issued Oct. 3, 2006, entitled "AN OPTICAL SIGNAL RECEIVER PHOTONIC INTEGRATED CIRCUIT (RxPIC), AN ASSOCIATED OPTICAL SIGNAL TRANSMITTER PHOTONIC INTEGRATED CIRCUIT (TxPIC) AND AN OPTICAL TRANSPORT NETWORK UTILIZING THESE CIRCUITS", all of which patent applications and patents are incorporated herein by reference. Reference to measuring signal performance can be implemented in either the electrical or optical domain.

Information can be transported as a signal or signals. FIG. 2 shows one example of communication between node 3210 and node 3220. Network 3240 represents any intermediary networking system, including but not limited to, fiber, intermediary nodes or intermediary networking systems between nodes 3210 and 3220.

Referring to FIG. 2, a signal routed from node 3210 to 3220 can be divided into a plurality of signal portions 3230. One method of dividing a wave division multiplexed signal is to demultiplex the signal prior to transmission. This provides more flexibility for the network since each signal portion can be routed separately and then restored at the receiver node 3220. The signal portions can be routed on a plurality of different channels on a single or multiple communication paths. In one embodiment, each channel can be a carrier wavelength. The communication paths can be paths on a single fiber, paths through common intermediary nodes, paths on different fibers or through different intermediary nodes.

FIG. 2 illustrates the signal divided into four signal portions 3230, however, as understood by one of ordinary skill in the art, the signal can be divided into two or more signal portions. Once the signal has been divided, the divided signal portions 3230 can be transported as different channels. The wavelengths can be transported as part of a group called a virtual super wavelength.

Each channel can be transported on a different communication path 3250, 3252, 3254, 3256 providing for added flexibility in routing the signals. Consequently, the networking system is not limited to selecting a path capable of transporting the entire signal since the signal is divided into multiple signal portions that can be transported separately. This improves QoS and permits higher bandwidth signal transportation over longer distances.

However, since the signal transported was divided prior to transmission, it must be combined at the destination node 3220 to recreate the transported signal. In order for the original signal to be restored at the destination node 3220, the skew between the channels 3235 should be within a skew constraint. Skew may be defined as a variation relative to the initial timing of a component of a launched data signal or differential latency between the signal portions.

Skew can arise from many different causes depending upon the transmission medium and length over which information is communicated. For example, intrachannel skew and interchannel skew can arise because different wavelength carriers propagate at different rates. In particular, a high frequency carrier signal will generally take a relatively longer period of time to propagate along an identical length fiber as a lower frequency carrier signal. Skew can also arise because the different channels are transported on different paths. The paths may be of varying lengths or have varying numbers of intermediary nodes. Skew becomes an increasingly important consideration when routing signals on different paths because the skew can grow tremendously as a result of varying latencies between the paths.

As shown in FIG. 2, separate communication paths 3250, 3252, 3254, and 3256 are chosen. In the embodiment shown in FIG. 2, four different paths are selected. The networking system of the present invention considers skew in selecting the communication paths by determining, monitoring, analyzing, and adjusting the skew, as further described below.

Figure 3:
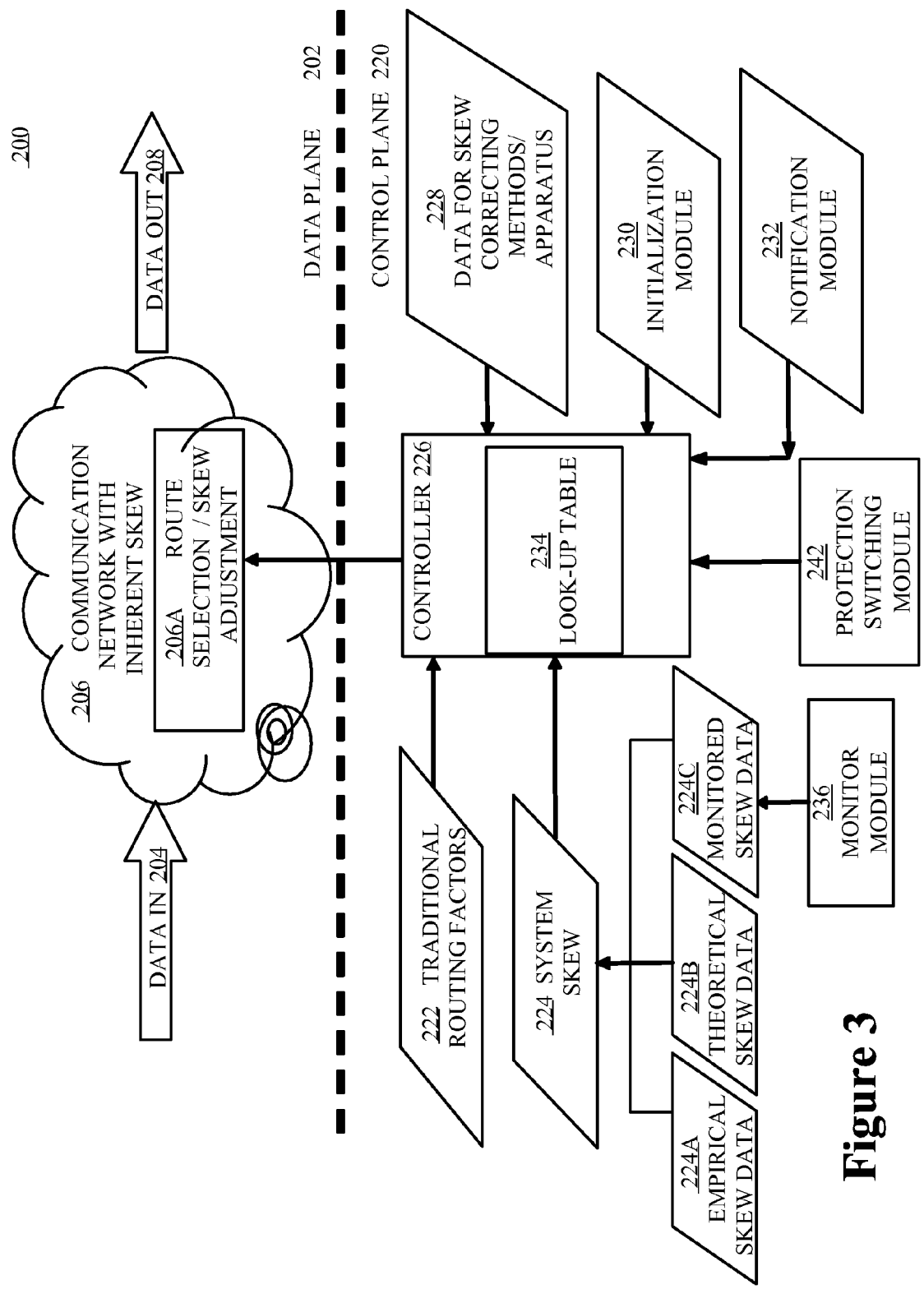
FIG. 3 is a functional block diagram of a communication network that considers skew information for routing information on a network, in accordance with various aspects of the present invention.

FIG. 3 illustrates a functional block diagram 200 of a communication network that considers skew data for routing information across a network in accordance with various aspects of the present invention. Ingress data 204 is provided to communication network 206 as client signals in the data plane 202 and is communicated to another node in the network and exits as client signal egress data 208 in the data plane 202. In a communication network using multiple communication paths to transport a signal as signal portions, skew should be addressed in order to avoid certain types of network failure events such as dropping signals, losing packets caused by overflowing a memory buffer and missing quality of service standards.

Embodiments of the present invention provide for route selection and skew adjustment 206A in communication network 206 via controller 226 in the control plane 220 of network 200. The controller 226 receives traditional routing factors input 222, such as distance, traffic load, and other factors related to characteristics of the path(s). Controller 226 also receives system skew information input 224 that can be derived from theoretical skew data calculation input 224B described below in reference to FIG. 4, or from empirically measured system performance and characteristics input 224A described below in reference to FIG. 5.

In some embodiments, controller 226 can also receive monitored skew data input 224C from monitor module 236. Monitor module 236 monitors the skew in the network at a particular interval and provides real-time monitored skew data 224C to the controller 226. The monitored skew data may differ from the skew input received from the empirical skew data 224A and the theoretical skew data 224B.

System skew 224 may be existing skew properties in the network that must be overcome in order to meet an allowable skew specification at a destination. Additionally, controller 226 also receives input data 228 for skew correction, such as theoretical and available electronic and optical skew adjustment resources, re-routing options and availability and prioritization of resources, etc.

In some embodiments, controller 226 can also receive input from initialization module 230 and notification module 232. Initialization module 230 performs functions associated with initial determination of network paths when ingress data 204 is sent through communication network 206. The initialization module 230 considers skew in selecting a communication path for the signals transported. In the event no paths can be selected with acceptable skew, the notification module 232 sends a notification alerting a user of the system that no path can be selected with acceptable skew.

In some embodiments, protection switching module 242 detects a failure for example a broken cable or a cable that has sufficient signal degradation to effectively be broken. The detection could also be accomplished as part of the skew analysis since a failure will result in a large skew value. Protection switching module 242 also performs a protection switch. The protection switching can use any protection switching technique. However, when the protection switching is performed, skew is analyzed and considered as described in this disclosure.

In one embodiment, the controller utilizes look-up table 234 to maintain data related to skew. The data related to skew can be stored in the form of latency values associated with each span or multiple spans. By way of demonstration, an exemplary version of look-up table 234 is shown below. One skilled in the art will understand that the table shown is only one example and that the table can be stored in software, hardware, firmware or a combination thereof.

Figure 1:
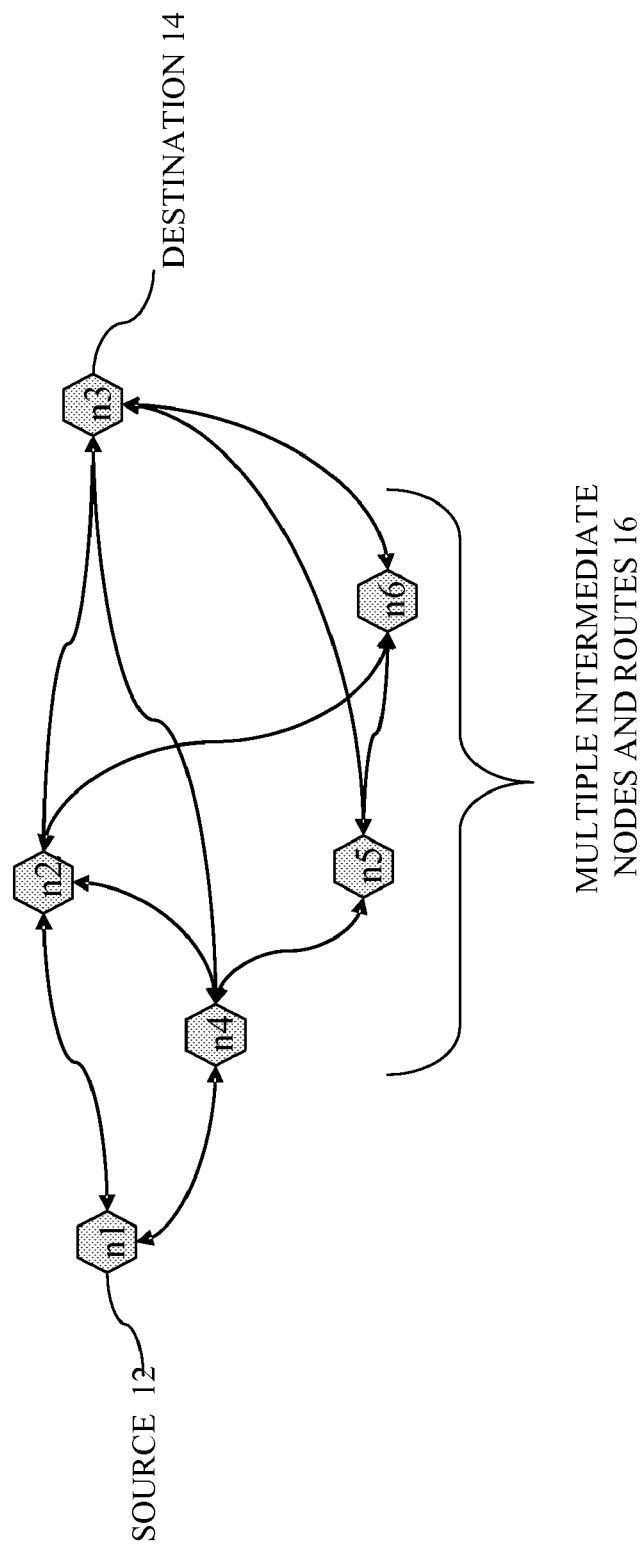
FIG. 1 is a schematic of an optical transport network, in accordance with various aspects of the present invention.

The information contained within look-up table 234 may also be stored in another, non-tabular, format. The table below has two columns: path and latency. The path column includes information related to various different paths within the network system that are available. The path information could be related to a communication between two nodes along a fiber or between two nodes along a fiber with intermediary nodes or systems. The latency column indicates the latency associated with the path in the same row. The present invention, including look-up table 234, could operate in conjunction with a conventional networking system. FIG. 1 is referenced to describe the paths shown in the table below.

| Path | Latency |
| --- | --- |
| n1-n2 | $t_1$ |
| n2-n3 | $t_2$ |
| n1-n4 | $t_3$ |
| n2-n4 | $t_4$ |
| n4-n5 | $t_5$ |
| n5-n6 | $t_6$ |
| n4-n3 | $t_7$ |
| n2-n6 | $t_8$ |
| n5-n3 | $t_9$ |
| n6-n3 | $t_{10}$ |

The exemplary look-up table above illustrates using latency values for each span rather than every path in the network. One skilled in that art will understand the table could be expanded to include latency values associated with additional paths as well as skew data associated with span or path pairs or groupings.

The latency values in the above look-up table can be determined empirically resulting in empirical skew data 224A, theoretically resulting in theoretical skew data 224B, or dynamically by monitoring the network system resulting in monitored skew data 224C, as will be described below with reference to FIGS. 4, 5 15, and 16.

The above look-up table can be used to determine the skew between any two or more paths on the networking system shown in FIG. 1. For example, to communicate between nodes n1 and n3, there are many available paths some of which are listed and described below:
1) n1 to n2 to n3
2) n1 to n4 to n3
3) n1 to n2 to n6 to n3
4) n1 to n4 to n5 to n3

5) n1 to n2 to n4 to n5 to n3
6) n1 to n2 to n6 to n5 to n3
7) n1 to n4 to n5 to n6 to n3
8) n1 to n4 to n2 to n6 to n3

In one embodiment, the communication between nodes n1 and n3 can be divided into two or more signal portions. Each signal portion can be transported on a different path. For example, one portion can be transported on path number 1 (n1 to n2 to n3) and another portion can be transported on path number 8 (n1 to n4 to n2 to n6 to n3). Controller 226 can use look-up table 234 to determine the latency associated with path number 1 and the latency associated with path number 8 by summing the latencies of the individual spans or by incorporating additional rows in the table shown above to store the latencies for paths with intermediary nodes. For example, the latency for path number 1 ($L_1$) is the sum of $t_1$ and $t_2$ and the latency for path number 8 ($L_8$) is the sum of $t_3$, $t_4$, $t_8$, and $t_{10}$. Additionally, the skew between path number 1 and path number 8 can be determined. Alternatively, look-up table 234 can be expanded to include skew as well as latency. The skew between path number 1 and path number 8 is the absolute value of the difference between $L_1$ and $L_8$.

Skew can also be determined between three or more paths using a similar equation. For example, skew between path numbers 1, 2, and 8 can be similarly calculated. The latency associated with path number 2 ($L_2$) is the sum of $t_3$ and $t_7$. The skew between the three paths is the absolute value of the difference between the greatest and least of the latency values. For example, assuming $L_1<L_2<L_8$, then the skew is the absolute value of the difference between $L_1$ and $L_8$. A similar skew determination can be used for skew between four or more paths.

Initialization module 230 can use the information relating to skew to select routes or paths for the various signals and signal portions. For example, initialization module 230 can compare the skew between paths numbers 1 and 8 to a skew threshold. If the skew is less than the skew threshold, then the information can be co-routed on paths 1 and 8. If the skew is greater than the skew threshold, then other available paths can be analyzed based on skew using a similar procedure to the one described above. If there are paths that can be selected, then the initialization module 230 and the route selection/skew adjustment module 206A selects the paths that meet the skew constraints. Otherwise, notification module 232 sends an alert indicating that the signal cannot be divided and transported. Additionally, each possible path can be examined and the paths with the least skew can be chosen. Furthermore, skew can be included along with a number of other considerations used in selecting an optimal set of paths. The other considerations may be bandwidth considerations, traffic load, Quality of Service, route length, latency, and any other relevant consideration.

One way to determine the skew threshold or skew constraint is to evaluate the amount of skew that can be compensated for or adjusted by the networking system, as described below in reference to FIGS. 7A-D and 8-12. There are a number of ways to compensate for skew or adjust skew, including, compensating for skew at the transmission node, at the receiver node, or at any or all intermediary nodes. Skew compensation can be achieved in the optical domain using one or more optical buffers, coils of fiber. Skew compensation can also be achieved in the electrical domain using one or more first-in-first-out ("FIFO") buffers. The size of the optical and electrical buffers can be adjusted thus altering the skew constraints.

The modules and functionality shown in the control plane of FIG. 3 can be accomplished centrally within the network, at each node in the network, or a combination thereof. A central network management station can include a controller, or microprocessor, with associated memory, I/O, and other hardware/software to enable the execution of logical instructions on input and output data. The network management station can be a UNIX box, or any other operating system suitable to accomplish the functions mentioned herein. Central network management station is linked to the nodes of the network system.

The present invention is well suited to any coupling arrangement, via any medium, to allow communication between the data and control planes in communication networks. The present invention may only link a portion of the nodes in parallel, which then could subsequently link a coupled series of nodes.

Alternatively, a distributed network management architecture could be employed. In particular, at least one node could have connectivity to another node (intranodal) to allow for the communication of resource status in the node for skew adjustment. The present invention is well suited to any form of connectivity that allows for distributed control for skew measurement, communication, status, control, and/or etc. to/from a node, e.g., by optical supervisory channel ("OSC"). A given gateway network element ("GNE") might have connectivity to multiple service network elements ("SNEs").

Alternatively, each node may have standalone skew measurement and correction capacities to simplify the required interaction between the nodes. The present invention is well suited to any combination of these or other control models that allow skew measurement and/or adjustment.

Figure 4:
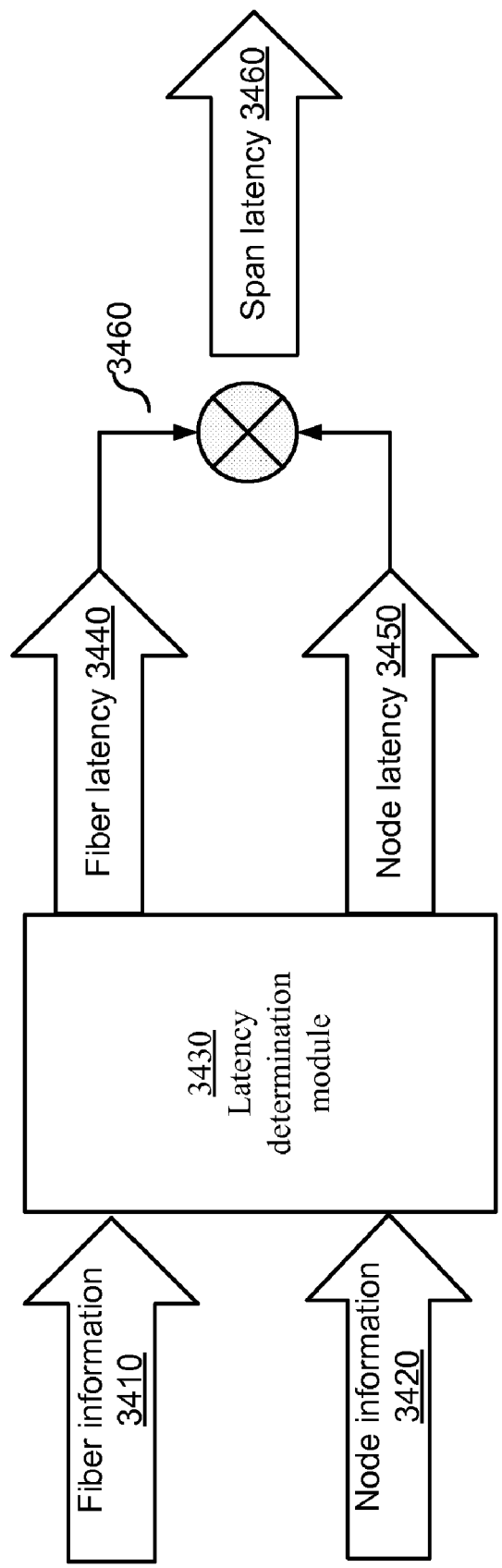
FIG. 4 is a functional block diagram of a system illustrating a priori latency determination.

FIG. 4 is a block diagram further illustrating a priori determination of latency used to generate the theoretical skew data 224B shown in FIG. 3. In the embodiment shown in FIG. 4 latency is predicted in advance of communication on the networking system. The latency differential between two communication paths is used to determine the theoretical skew data 224B as described above. Since communication paths utilize one or more fibers and nodes and latency information about the fibers, fiber length, and nodes can be known, that information can be used to predict the total span latency. Fiber information 3410 and node information 3420 are inputs into latency determination module 3430. Latency determination module 3430 outputs latency as result of a fiber 3440 and latency as a result of a node 3450. The fiber latencies 3440 and node latencies 3450 are summed at summing junction 3460 to compute the span latency 3470. The fiber information 3410 used by latency determination module 3430 includes properties of the fiber related to the latency that results from transmission along the fiber, for example, the length and dispersion of the fiber. Node information 3420 includes properties of the node related to the latency within a node. Once span latency 3460 is determined, look-up table 234 or other latency reference can be updated to include the predicted latency values 3470.

Figure 5:
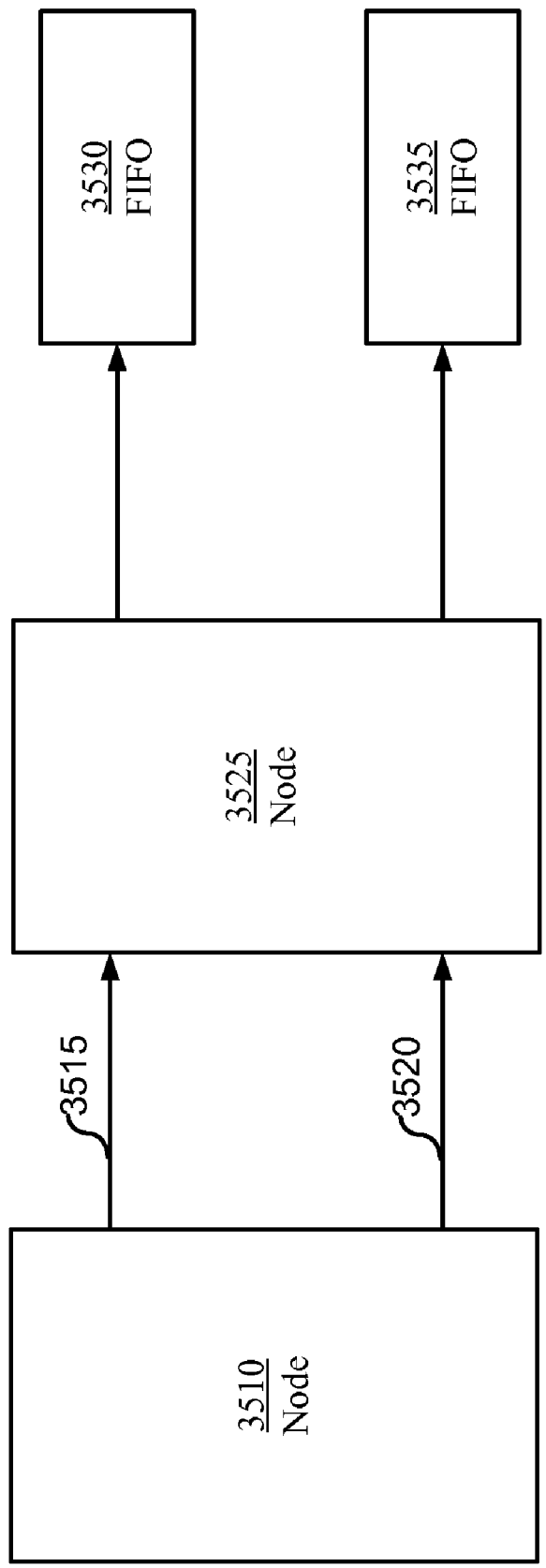
FIG. 5 is a functional block diagram of a system illustrating empirical latency determination, in accordance with various aspects of the present invention.

Another way to determine latency, and therefore skew, is to determine it empirically by measuring the skew between two paths. Skew can be determined empirically prior to setting up a communication path. FIG. 5 is a block diagram illustrating an empirical determination of latency across a span. Referring to FIG. 5 a network span is shown between transmission node 3510 and receiver node 3525. In the embodiment shown in FIG. 5 the signal is divided into two portions 3515 and 3520 for communication. A timing marker is included as part of each signal. The marker is a preset bit pattern that will be used by a receiver node 3525 to match the same pattern in a test signal, whose arrival time will then be evaluated. The marker should be sufficiently unique, such as a pseudo-random binary sequence ("PRBS"), that it is not confused with a data signal. The marker may be a stand-alone signal(s) or may be inserted into a client signal running live traffic.

When the signal is received at receiver node 3525 a set of first-in-first-out ("FIFO") buffers 3530 and 3535 can be used to store the signal, including the timing marker. The time difference between the timing markers indicates the skew between the two communication paths shown in FIG. 5. One skilled in the art will recognize that the above empirical skew determination can be used with two or more two communication paths.

In one embodiment, both theoretical and empirical skew determinations may be employed. Look-up table 234 may be created and/or updated based on theoretical skew data 224A, empirical skew data 224B, or a combination thereof. Monitor module 236 determines monitored skew data 224C by repeating the empirical skew determination described above at regular intervals. Monitored skew data 224C can be used to dynamically update look-up table 234.

Figure 6:
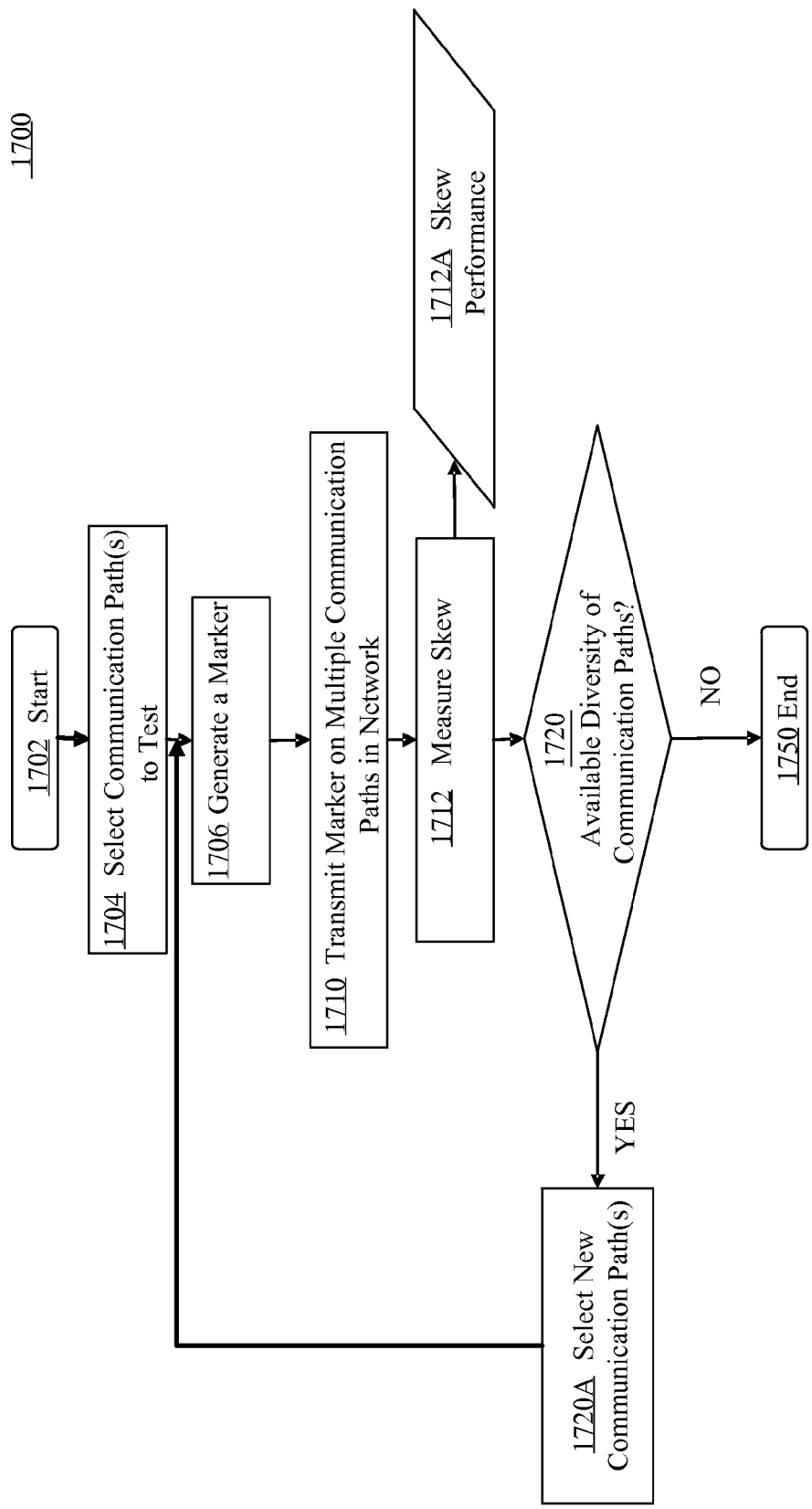

The flowchart in FIG. 6 describes a method, independent of structure, which may be implemented in various embodiments of the invention. In various embodiments of the invention, associated data from a client signal is distributed and routed by different physical routing (nodes and fibers), different wavelength groupings, different wavelengths and/or Optical Carrier Groups ("OCGs"), and with different skew adjustments. The specific communication paths provided therein are an exemplary allocation of routing and skew adjustments by a controller that evaluated system skew performance and resources.

FIG. 6 is a flowchart 1700 of a process to empirically measure the skew of information transmitted by multiple paths in a communication network in accordance with various aspects of the present invention. Measuring the skew of a given path can occur prior to establishing a circuit for a given client signal to provide more reliability in the quality of the signal as it is transported through a network.

A communication path(s) is selected 1704 in order to test skew properties thereof. Communication paths may be defined as having various lengths with differing number of intermediary nodes including, but not limited to, span-wise evaluation, route-wise evaluation (e.g., from source node to destination node), or round-trip-wise and then back to original source node).

A marker is generated 1706 for transmission on the chosen communication path(s). The marker is transmitted 1710 on multiple communication paths in the network. The communication paths can be tested in a parallel fashion, such that relative skew between two communication paths may be measured, or tested in series with synchronization and timing comparisons made by comparison to an accurate reference clock. The transmission of the test signal with marker can be performed either while the entire network is down, or while the network is communicating traffic on channels other than the channels, or communication paths, to be tested.

The skew is measured 1712 and output as 1712A skew performance and communicated to either local nodes or to centralized controller. Skew data can be stored as a new variable, or object, in the Link Stated Advisory ("LSA") table, for consideration in choosing a communication path in the network.

If diversity of communication paths exists 1720, in terms of carrier wavelengths, OCG groups, physical routing on nodes or fibers, etc., then in step 1720A, a new route is selected and is evaluated using the marker at step 1706 onward. In this manner, the combinations and permutations of communication paths available in the communication network can be tested and evaluated for future use. The test process 1700 can be repeated at timely intervals, such as programmed maintenance ("PM"), existing downtime, or as interleaved with revenue traffic on the network, as resources permit, especially during low traffic periods. If an update provides a substantial change in the skew performance, notices or interrupt signals may be generated and forwarded to appropriate users, controllers, for remedial management of the network. In one embodiment, the networking system not only determines the skew, but can also compensate for the skew.

FIGS. 7A through 7D illustrate different skew routing and skew adjusting techniques that allow for improved efficiency, flexibility, and cost-effective skew management of information transmission through the network. An exemplary client signal to be transmitted on the networks 400A through 400D is demultiplexed into multiple channels to accommodate the size of the client signal. In this case, client signal is broken into multiple signal portions $C_1$-$C_4$ and communicated on network carrier frequencies, shown as $\lambda_1$, $\lambda_K$, $\lambda_L$, and $\lambda_M$, which are also referred to as a first virtual super wavelength ("VSW1A").

The quantity and frequency of channels within an OCG may vary in accordance with the network system and environment in which it operates. For example, an OCG may depend on the resources available on the network, the skew and traditional metric performances of the network, and the controller assigning the resources. The VSW1A is received and re-sequenced at the destination node (e.g. node N3) with acceptable skew performance, for reconstruction of the client signal and egress from the network. The information routing or skew adjustment described herein can be employed in combination or permutation with each other to provide additional options in routing and skew adjustment for the overall system. FIGS. 7A through 7D can be implemented in one embodiment employing hardware shown in FIGS. 8-10, and employing processes described in FIGS. 15 and 16.

Figure 7A:
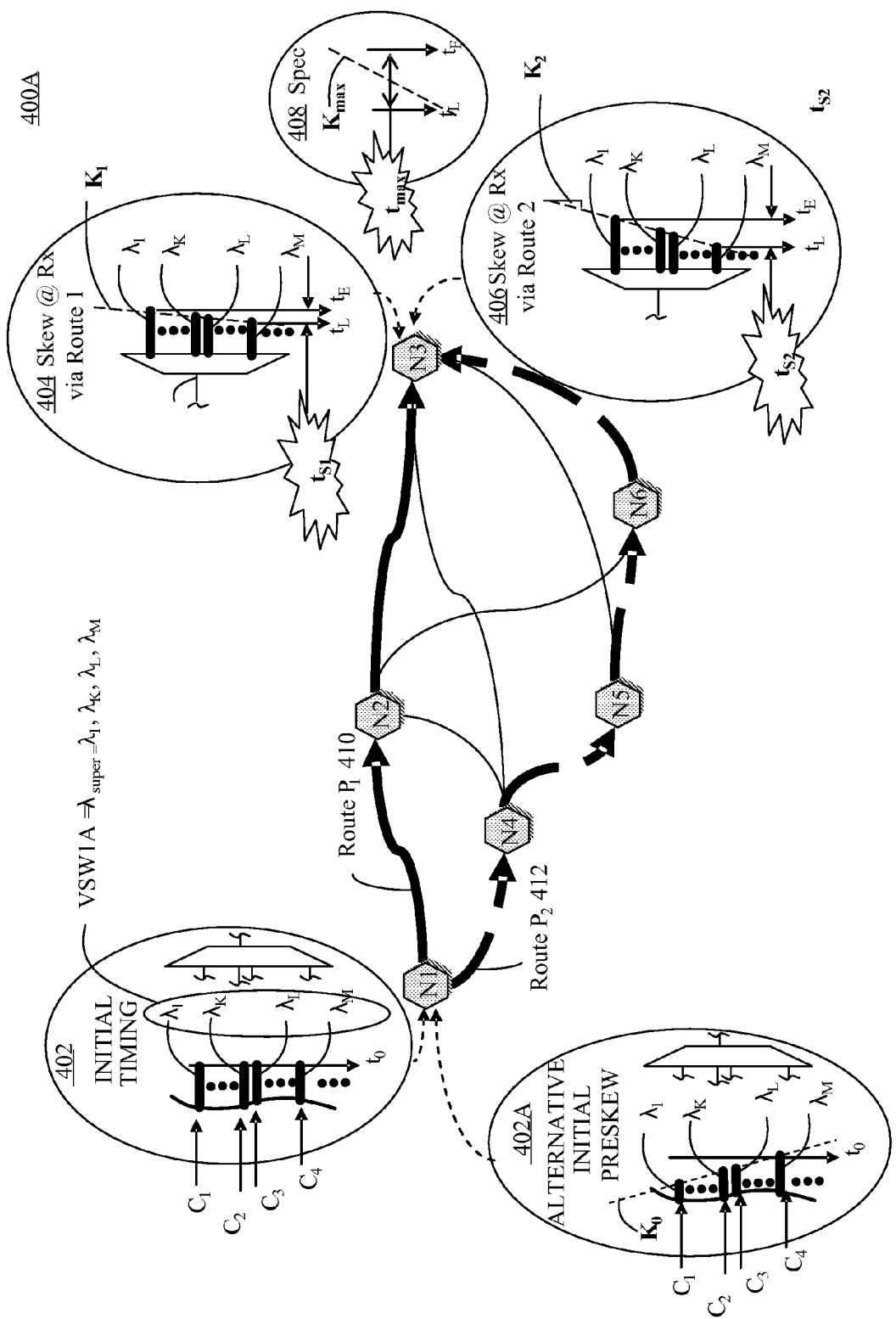
FIG. 7A is a network illustration of skew performance variation occurring over multiple communication paths via multiple routes, and the identification of the better route in terms of skew, in accordance with various aspects of the present invention.

Referring to FIG. 7A, a network illustration 400A of skew performance variation occurring over multiple communication paths and the identification of the better route in terms of skew is shown, in accordance with various aspects of the present invention. Initial timing of associated data can either be synchronized as shown in initial timing 402 at $t_0$, or can implement a preskew timing of signals 402A, wherein information on $\lambda_1$ is delayed relative to the other wavelengths. The group of wavelengths is increasingly delayed from $\lambda_1$ to $\lambda_M$ of VSW1A relative to $t_0$ with a preskew dispersion slope $K_0$.

The allocation of data across the multiple routes is determined by the skew between the channels (e.g., $\lambda_1$, $\lambda_K$, $\lambda_L$, $\lambda_M$). If associated data signals are transmitted on route $P_1$ 410, then the resulting skew is the time difference between the earliest signal $t_E$ and latest signal $t_L$ occurring between the signals at their destination, node N3, illustrated as skew 404 (e.g., time $t_{s1}$) with an associated skew dispersion slope of $K_1$. Alternatively, if the associated data signals are transmitted via route $P_2$ at 412, there results at the destination node N3 a timing skew 406 is illustrated, such as $t_{s2}$, with an associated skew dispersion slope of $K_2$.

The skew associated with the different routes $P_1$ and $P_2$ may be analyzed at the destination node to select an optimal route. These different skews may also be compared to certain parameters 408, such as max allowable skew $t_{MAX}$, or maximum allowable skew slope $K_{MAX}$ in order to select a preferred route. The skew may also be analyzed at intermediate nodes to select an optimal route or identify that skew falls within parameters.

The evaluation of skew may identify that skew has fallen outside of a preferred specification or range, and initiate a skew adjusting procedure. The skew consideration of each link, or span, in the network may be considered and summed for analysis relative to the allowable skew tolerance for a given communication network specification or standard.

Figure 7B:
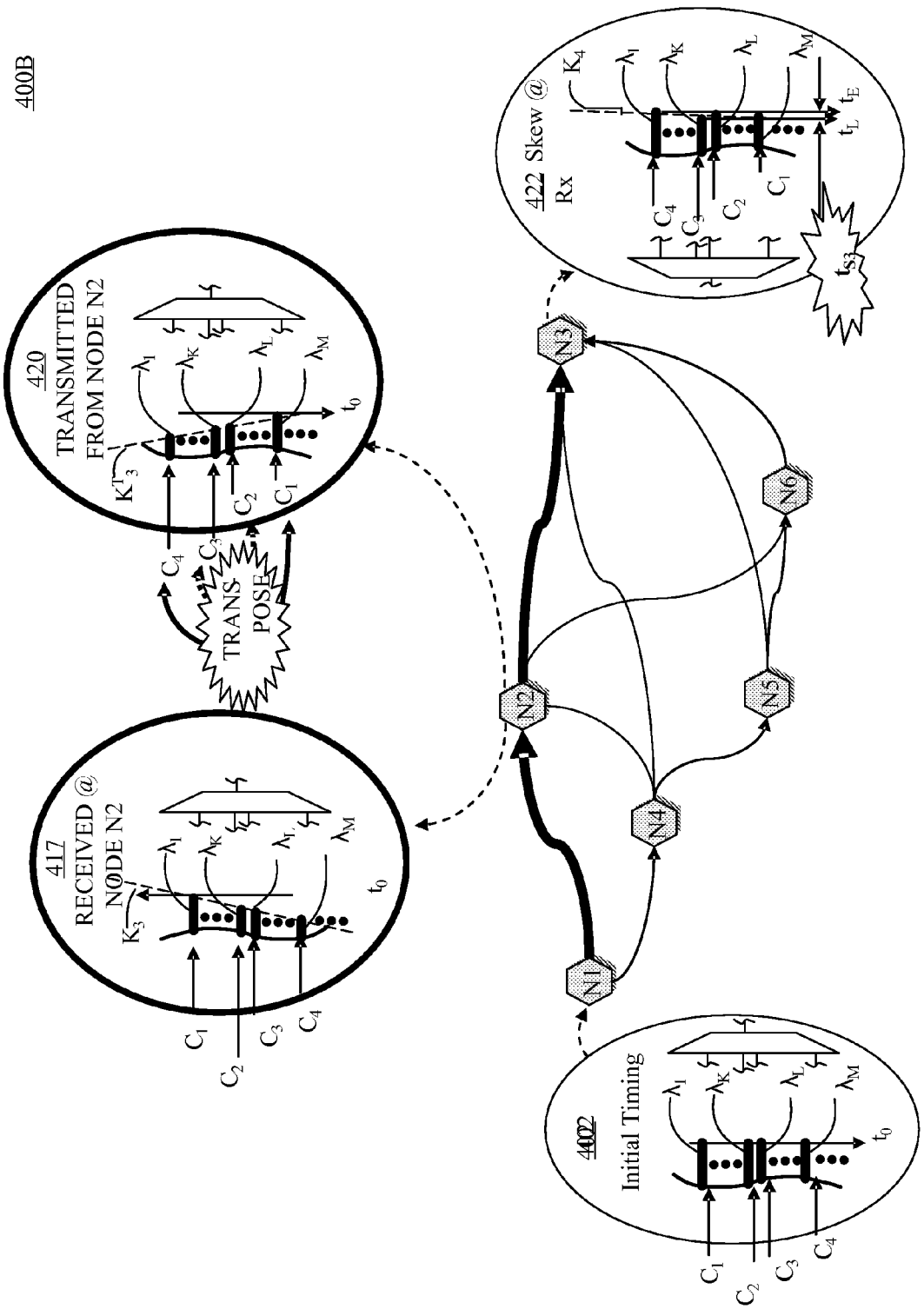
FIG. 7B is a network illustration of skew adjustment via wavelength reassignment of the multiple communication paths at a node between the source node and the destination node, in accordance with various aspects of the present invention.

Referring to FIG. 7B, a network illustration 400B of skew adjustment via wavelength reassignment of the multiple communication paths is shown in accordance with various aspects of the present disclosure. In these embodiments, a given client data signal is separated into four subsignals (e.g., signal portions $C_1$-$C_4$) to be routed on different communication paths over the network as associated data. Associated data means the multiple signals are associated with each other as being part of the original client data signal and are reassembled at a destination node to recreate the client data signal.

The format of the signal portions may depend upon the protocol of a given system such as protocols defining the distribution of payload, forward error correction ("FEC") data, overhead (OH) data, etc. Assuming initial timing 402 in FIG. 7B, if a set of associated data signals are determined to have unacceptable skew performance at the destination or any intermediate node, wavelength reassignment may be utilized to improve the skew performance in the nodal network.

At an intermediate node, for example, if the signal is wavelength-swapped, then interchannel dispersion occurring between high and low frequencies can be compensated by inversing the wavelengths where the longest wavelength is swapped for the shortest transmission wavelength and the next longer wavelength is swapped for a shorter wavelength. In effect, the wavelengths are reversed in a manner that previously longer wavelength signals are substituted with shorter wavelength signals. For example, signal portion $C_3$ and $C_2$ are rerouted to be carried on swapped frequencies (e.g., $C_3$ is now carried on $\lambda_K$ and $C_2$ is now carried on $\lambda_L$). This can be accomplished by optical signal wavelength conversion, or by an optical-to-electrical-to-optical conversion that reassigns a signal portion to be transmitted on a channel with a different frequency laser.

If associated data signals are received at node N2 with dispersion slope $K_3$, as shown in the upper left side of FIG. 7B at 417, then the carrier wavelengths can be wavelength-swapped for a given set of associated data for a given client signal. Thus, if signal portions $C_1$-$C_4$ of a client signal are transmitted on carriers $\lambda_1$, $\lambda_K$, $\lambda_L$, and $\lambda_M$, respectively at source node N1, they can be transposed at intermediate node N2 to carriers $\lambda_M$, $\lambda_L$, $\lambda_K$, and $\lambda_1$, respectively, with new dispersion slope $K^T_3$ as seen at 420 in FIG. 7A. Wavelength reassignment in this embodiment assumes a linear dispersion slope of signal portions $C_1$-$C_4$ on carriers $\lambda_1$, $\lambda_K$, $\lambda_L$, and $\lambda_M$.

In an alternative embodiment, any signal portion can be reassigned to any carrier frequency, as best fits the overall skew reduction for the system, e.g., for non-linear channel performance as illustrated at 422 in FIG. 7A. After performing the wavelength reassignment, associated data $C_1$-$C_4$ is received at destination node N3 with a resultant adjusted, or minimized, skew 422 of $t_{S3}$, and associated nonlinear dispersion slope of $K_4$; a superior skew performance than the same signals would have had without the wavelength reassignment. Minimal skew is the resultant skew of the client signal portions at the destination node that meets the specified allowable skew tolerance for the system and that has been managed by the controller to provide either the least amount of skew available for the VSW or VWG on the available resources of the network or with a reasonable amount of skew in consideration for other performance tradeoffs.

Figure 7C:
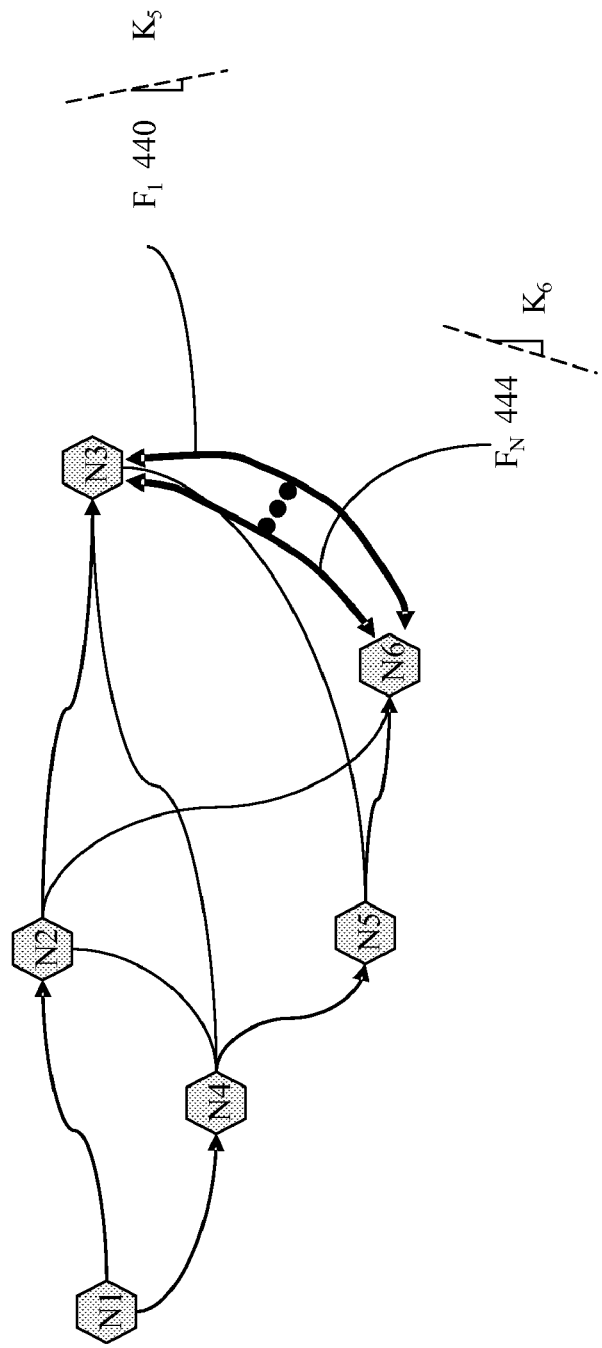
FIG. 7C is network illustration of skew adjustment via selection of one fiber from multiple fibers depending on the dispersion slope of the fiber, in accordance with various aspects of the present invention.

Referring now to FIG. 7C, a network illustration 400C illustrates skew adjustment via selection of one fiber from a possible group of different multiple fibers depending at least in part on the particular dispersion slope, $K_X$, of the fiber which is shown in accordance with various aspects of the present invention. Multiple optical fiber links, $F_1$ 440 to $F_N$ 444, are coupled between nodes N6 and N3, where each fiber may have different dispersion compensation slopes, $K_5$ and $K_6$, respectively. The multiple fiber route scenario via $F_1$ 440 to $F_N$ 444 is similar to multiple physical routes 410 and 412 involving different nodes in the network as illustrated in FIG. 7A. However in the present embodiment, there may not essentially be any diversity in fiber lengths of the fiber group between nodes N3 and N6 since these two nodes are at the same distance apart for any one fiber of the fiber group $F_1$ 440 to $F_N$ 444. Thus, a finer skew adjustment may be possible by considering only the nonlinear variations of the different fibers.

Figure 7D:
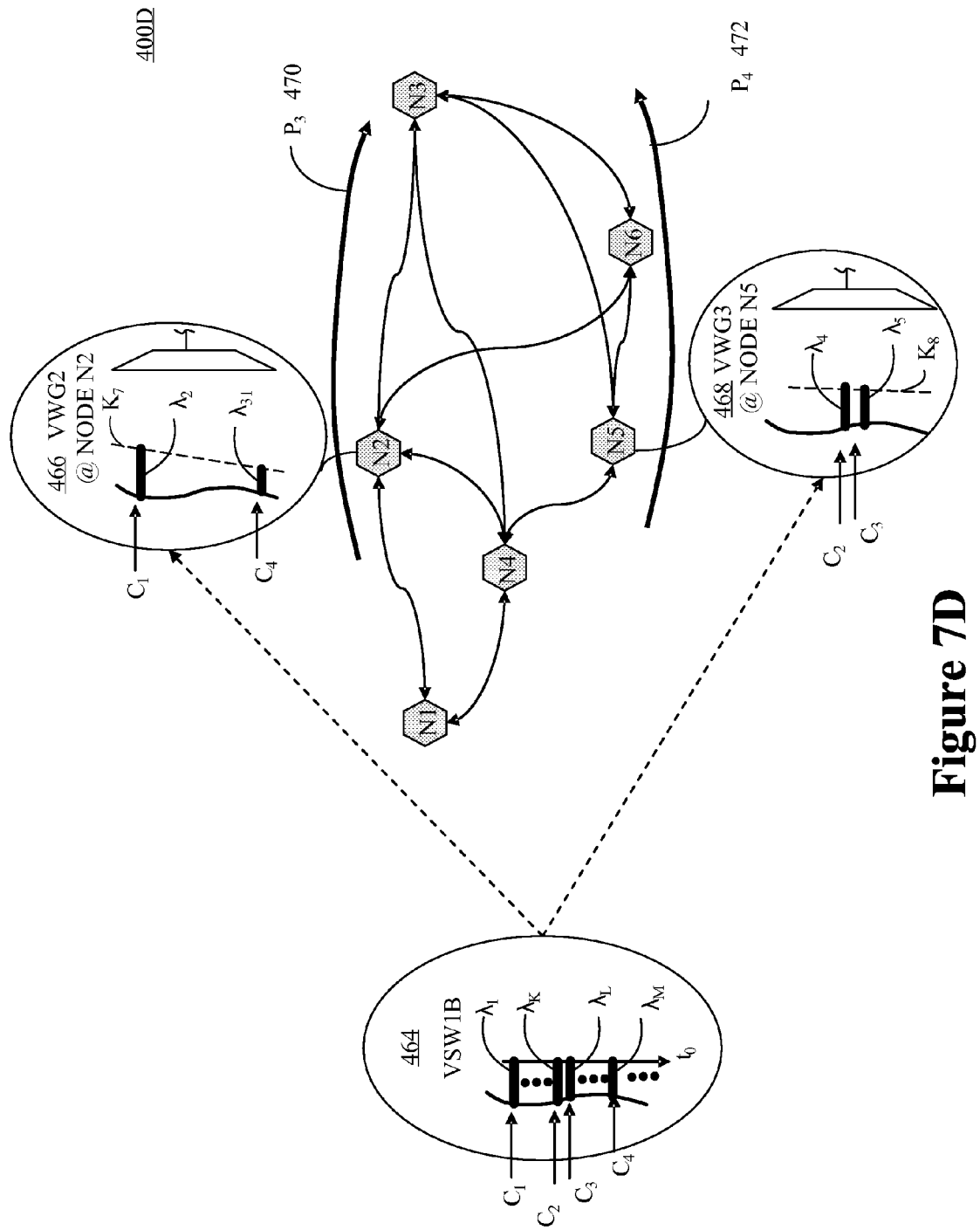
FIG. 7D is a network illustration of dividing a virtual super wavelength into multiple virtual wavelength groups and routing them on different routes on the network, in accordance with various aspects of the present invention.

Referring now to FIG. 7D, a network diagram illustrates a divided client signal into two routes in accordance with various aspects of the present invention. As defined above, a client signal may be routed as a virtual super wavelength ("VSW"); for example, the client signal is co-routed on multiple channels on the same path, the same nodes and/or fiber. If a VSW routing is not available, then the client signal may be routed along different routes on the network as two or more virtual wavelength groups ("VWG") (e.g. routed as multiple groups wherein each group of one or more channels is routed on the same path).

A VWG can be any size and grouping of signals as is appropriate for channel bandwidth between nodes, and that skew and other performance specifications allow. In the present example, associated data, VSW, is initially scheduled to be transmitted as associated client signal portions $C_1$-$C_4$ on carriers $\lambda_1$, $\lambda_K$, $\lambda_L$, and $\lambda_M$, where client signal portions $C_1$-$C_4$ refer to a portion of the client signal that is transmitted on any available carrier, e.g., $\lambda_1$, $\lambda_K$, $\lambda_L$, and $\lambda_M$. The specific content of $C_1$-$C_4$ and the specific wavelengths on any given path are decided by the controller, such as a central controller 302 or a node controller. Thus, as the traffic rate increases, the content distribution $C_1$-$C_4$ may vary across the respective carriers, e.g., $\lambda_1$, $\lambda_K$, $\lambda_L$, and $\lambda_M$. In fact, if the controller so evaluates it, the client signal may be adjusted from content distribution $C_1$-$C_4$ on carriers, e.g., $\lambda_1$, $\lambda_K$, $\lambda_L$, and $\lambda_M$ to content distribution $C_1$-$C_3$ on respective carriers, e.g. $\lambda_1$, $\lambda_K$, $\lambda_L$, and $\lambda_M$.

However, in this illustration, sufficient channel count, or bandwidth, was not available on path $P_3$ 470 between the source node N1 and the destination node N3 to co-route the entire client signal (e.g., client signal portions $C_1$-$C_4$) as a Virtual Super Wavelength, VSW1B 464. Consequently, the exemplary controller, evaluate the network demands (e.g., traffic load, network resources, bandwidths, etc.) and conclude that the VSW should be divided into two or more virtual wavelength groups. For example, VWG1 may be divided into client signal portions $C_1$ and $C_4$ on carriers $\lambda_2$ and $\lambda_{31}$ on transmitted on path $P_3$ 470, and wavelength group VWG2 may be divided into client signal portions $C_2$ and $C_3$ on carriers $\lambda_4$ and $\lambda_5$ on path $P_4$ 472. For simplicity, it is assumed that carrier wavelengths are consistent across the several spans shown, though carrier wavelength diversity can be used.

Note that in the present embodiment, client signal portions $C_1$ and $C_4$ are co-routed as one VWG2 on outer wavelengths $\lambda_2$ and $\lambda_{31}$, while client signal portions $C_1$ and $C_4$ are co-routed as another VWG3 on nominal wavelengths $\lambda_4$ and $\lambda_5$, similar to that illustrated in prior FIG. 7B. In this manner, skew of VWG2 at node N2 466 may undergo skew adjustment procedure because the more extreme frequency values, $\lambda_2$ and $\lambda_{31}$ of VWG2 will exhibit more skew, $K_7$, at node N2, than the nominal frequency values $\lambda_2$ and $\lambda_3$ of VWG3 with skew $K_8$ illustrated at N5 468. Thus, client signal portions C2 and C3 may not require skew adjustment between the source node and destination node.

Different quality of service signals may be routed in this manner to provide preferred performance characteristics. If client signal portions C2 and C3 are more time-sensitive, or contain more sensitive data, the portions may be transmitted on a preferred physical route, preferred carrier wavelength, preferred grouping, and/or preferred fiber (i.e., preferred with respect to minimized skew slope, signal dispersion, fiber dispersion, and resultant skew between client signal portions).

A client signal portion by itself, or a VWG, may be rerouted at a node to travel a different path. A re-routing of this sort is accomplished by communicating the client signal portion(s) to a multiplexing device, such as a band multiplexing module ("BMM") shown in subsequent FIG. 8, which subsequently multiplexes optical signals and communicates them to a given node. Rerouting of a VWG in the present disclosure is accomplished by switching in the electrical domain of a node and routing a client signal portion to a multiplexing module, whose function is to combine carrier frequencies within a given carrier group for transmission on a fiber medium, as shown in subsequent FIG. 8. If a client signal portion is switched to a different multiplexing module, then the same carrier wavelengths may be utilized for both VWGs, as they will not conflict on different multiplexing modules routing on different fiber links. If client portion signals are communicated on the same carrier wavelengths for different VWGs (e.g., on different paths) and if the client portion signals are to be combined or redistributed at a subsequent node, then any potential conflict of client signal portions on the same wavelength at that downstream node can be resolved by assigning appropriate non-conflicting wavelengths at the given node, as directed by the controller.

Figure 8:
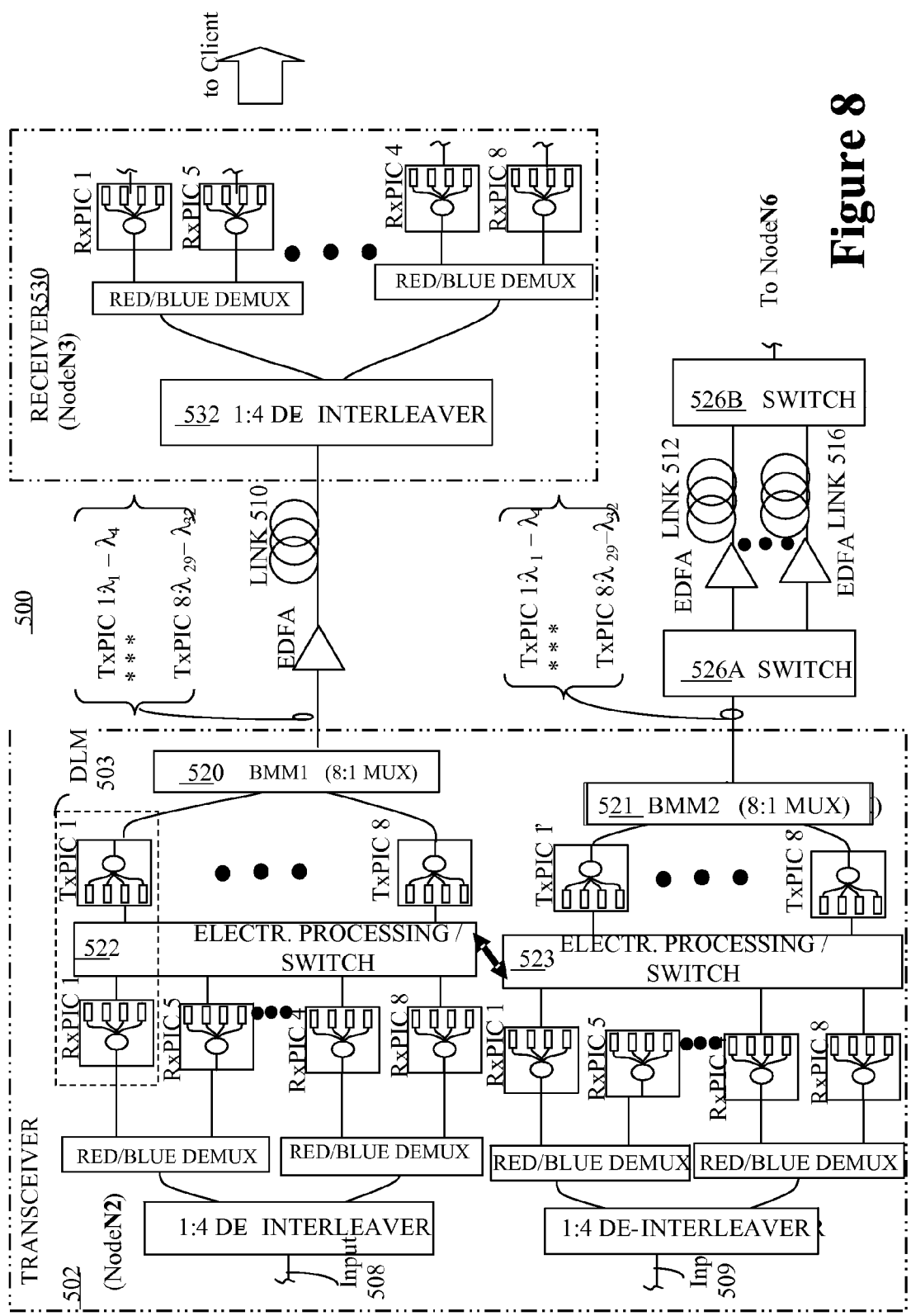
FIG. 8 is a schematic of a transceiver node with its internally coupled and switched band modules each coupled to different nodes for space diversity routing, in accordance with various aspects of the present invention.
Figure 9:
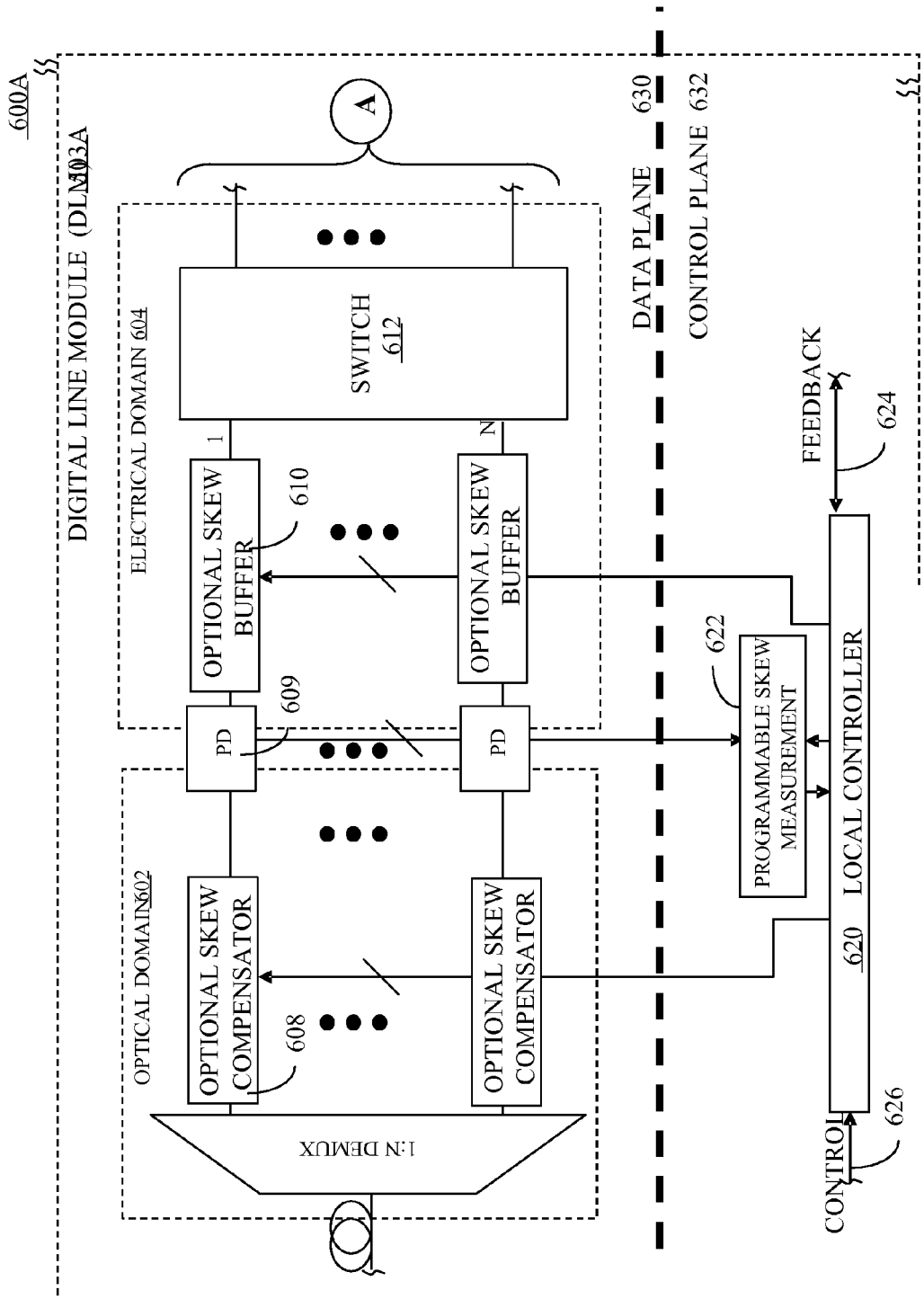
FIG. 9 is a schematic of a receiver portion of a line module wherein the receiver has optical skew compensation with electronic skew measurement and buffer, in accordance with various aspects of the present invention.
Figure 10:
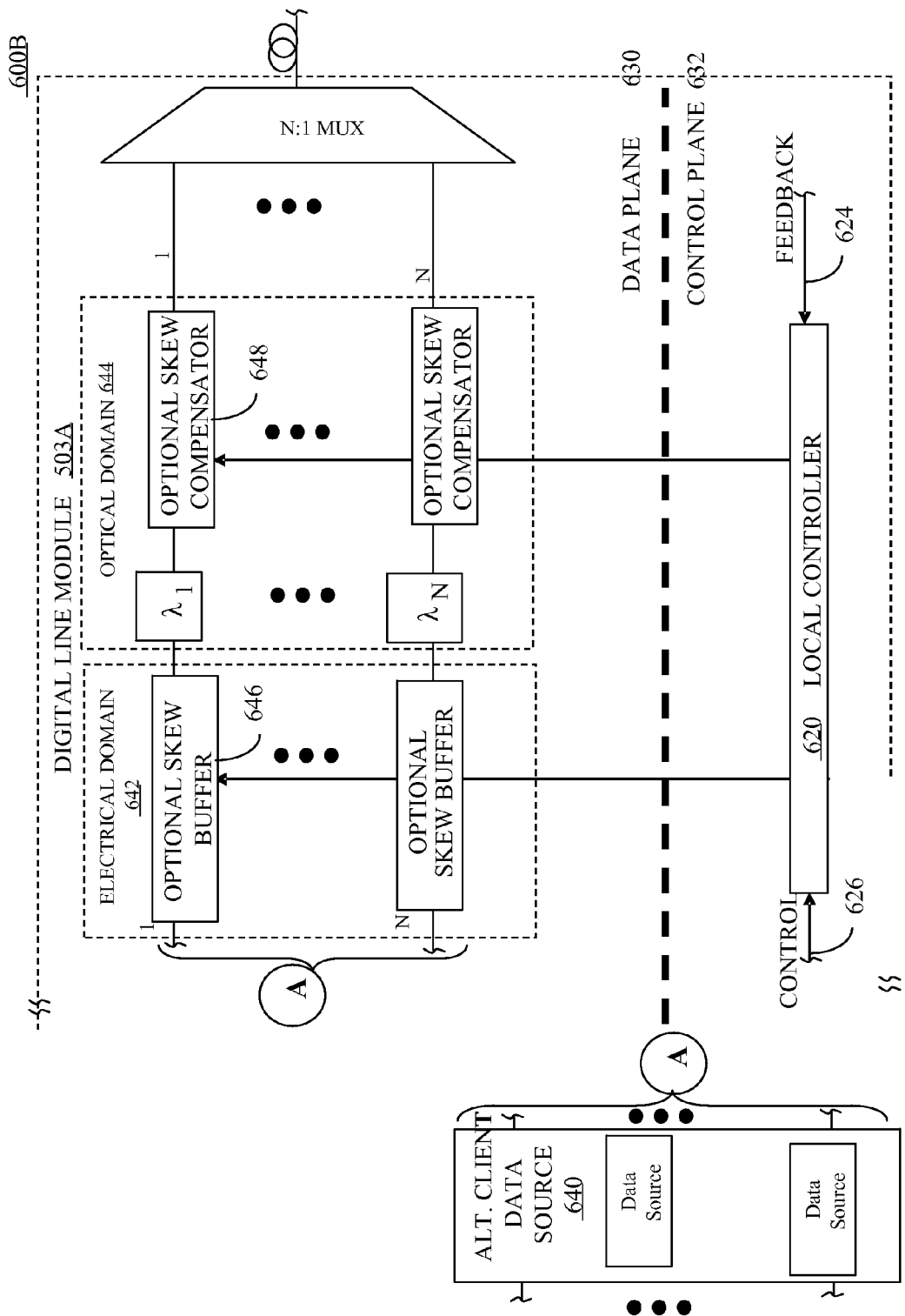
FIG. 10 is a schematic of a transmitter portion of a line module wherein the transmitter has optical skew compensation and electronic skew measurement and buffer, in accordance with various aspects of the present invention.

In FIGS. 8-10, a novel switching function in a node of a network is illustrated in accordance with various aspects of the present invention. The switching function allows rerouting of a portion of information, such as a portion of a client signal, on a different wavelength, different fiber, and/or to a different node. Rerouting can be managed so as to provide for skew adjustment in order to provide better quality of service of the overall information transmitted over the network.

FIGS. 8-10 also illustrate an apparatus for implementing the skew adjustment within an exemplary node that also employs optical to electrical to optical ("OEO") conversion. Once in the electrical domain, client signals enjoy the benefits of digital signal processing, switching (channel and band allocation), and signal regeneration that correspond to electronically implemented functions. However, the present invention is also well suited to performing functions off frequency translation/conversion for purposes of rerouting in the optical domain, e.g. using a PIC, PLC, or discrete electrooptical and optical devices. For example, a nonlinear process in semiconductor optical amplifiers ("SOAs") or a highly nonlinear fiber could be utilized to satisfy frequency translation/conversion needs. Additional detail on the design, function and architecture of the TxPIC, RxPIC and DON can be found in U.S. patent application Ser. Nos. 10/267,331, 10/267,212, and U.S. Pat. No. 7,116,851, all of which are incorporated by reference in their entirety.

Referring in particular to FIG. 8, system 500 includes a transceiver node 502 coupled to receiver 530 and coupled to Node N6 (not shown) via switches 526A and 526B in accordance with various aspects of the present invention. Transceiver node 502 is coupled to one or more multiplexing modules, such as band multiplex modules ("BMM"), each coupled to different nodes for space diversity routing. Transceiver node 502 correlates to exemplary node N2 from FIGS. 7A-7D, and has a portion of communication paths from the WDM signal outputs from TxPIC1 through TxPIC8 coupled via BMM1 520 and fiber link 510 to a downstream receiver 530 and its BMM 532 correlated to exemplary node N3 from FIGS. 7A-7D.

Transceiver node 502 is a multi-channel device with multiple DLM 503 modules each of which contain an RxPIC and a TxPIC, a group of which are coupled into a band MUX module ("BMM") that multiplexes the range of wavelengths (e.g., TxPIC1 $\lambda_1$ through TxPIC8 $\lambda_{32}$) into a WDM signal for transmission on fiber link 510 to a downstream node. Inputs 508 and 509 are coupled from upstream nodes in the communication network. Within each DLM, electronic processing and switching blocks 522 and 523 provide options to manage the transmitted information in the electrical digital domain, including skew management functions, described in more detail in subsequent figures. While all the wavelengths processed by transceiver 502 may be within in the C-band, this band may be divided between a red portion of the C-band, to represent lower wavelengths in the signal spectrum, and the blue portion of the C-band, to represent higher wavelengths in the signal spectrum. While the present embodiment constrains the spectrum of wavelengths for transmission within the C-band, the present invention is well-suited to using any combination and location of wavelengths such as utilizing multiple bands, e.g., L-band, S-band, any other band or to utilizing divisions within a band, for communication path diversity.

In certain embodiments, two nodes may be coupled via multiple fibers that can be selected for their different skew properties, such as their different dispersion properties between channels that will allow carriers at different wavelengths to arrive at a downstream node at different times. Transceiver node 502 has BMM2 521 coupled to node N3 via switch 526A and 526B on either end of the multiple links 512 through 516, which correlate, for example, to fiber $F_1$ 440 through fiber $F_N$ 444 of FIG. 7C, with different dispersion slopes K5 through K6, respectively. Switches 526A and 526B are any switch, that functions to couple one of the multiple fibers to each node, such as by an external 1xN mechanical switch, thermo-optic optical switch, or micro-electrical-mechanical ("MEMs") switch.

Referring now to FIGS. 9 and 10, a more detailed illustration of an exemplary transceiver digital line module ("DLM") 503A is presented in two parts, with FIG. 9 illustrating a receiver portion of the DLM, and FIG. 10 illustrating a transmitter portion of the DLM. DLM 503A in FIGS. 9 and 10 correspond to DLM 503 block portion of the transceiver 502 shown in FIG. 8. Output A from receiver portion of DLM is received as input A at the transmitter portion of DLM.

Referring specifically to FIG. 9, a schematic of a receiver portion 600A of a digital line module 503A is shown wherein the receiver has optical skew compensation, with electronic skew measurement and skew buffer in accordance with various aspects of the present invention. Receiver portion of DLM 503A has an optical domain 602 with customary components such as 1:N DEMUX and an array of photodetectors (PDs) for $\lambda_1$ to $\lambda_N$.

Certain embodiments provide coupling from the photodetectors to a programmable skew measurement device 622. The skew measurement device is enabled to capture skew measurements via a comparator (e.g., a differential sense amplifier, and other digital signal processing techniques) that correlates the output from a photodetector with a predetermined bit pattern. The bit pattern is replicated in a marker of a test signal transmitted to the DLM 503A during a learning mode for the network. This skew testing process is also referenced in process 1700 of FIG. 6. Skew measurement device 622 has multiple instances of correlation ability along with a local clock input for measuring the difference in time from receipt of the marker for each of the multiple channels $\lambda_1$ to $\lambda_N$. Alternatively, programmable skew measurement device 622 may include the capability to perform a relative comparison measurement between any two wavelengths at a given time for comparison testing. This pattern can be repeated for different wavelengths, as directed by local controller 620, in combination with a central network controller.

Local controller 620 is coupled to skew measurement device 622, in the control plane 632, to provide initiation signals for test mode, selection of wavelengths to measure, and reception of skew data. Local controller 620 in the current node is coupled via a unidirectional or bidirectional line 624 to other nodes in the network to share skew data measurements, skew resource status, skew needs, and skew resource allocation.

Besides providing skew measurement control, various nodes in these embodiments of the invention provide an optional skew compensator 608 for each channel in the optical domain 602 of the node and optional skew compensator 610 in the electrical domain 604. Skew buffer 608 may be any optical device with delay properties, such as a ring resonator. In various embodiments, an optional skew compensator is provided for only a portion of the signal channels in the DLM 503A, such as on channels on which signals propagate at a higher rate per unit time, such as those on lower frequency channels. In other embodiments, optional skew compensator has a bypass that is enabled via local controller 620 if no skew adjustment is needed. Lastly, in another embodiment, no optical skew compensation is used because of higher cost, and sufficient capability of skew adjustment via routing, and/or buffering in the electrical domain.

Similar to optical skew buffer 608, optional electronic skew compensator 610 may be any buffer medium, such as a first-in-first-out ("FIFO") memory buffer, which delays the information on the given channel. In different embodiments, optional electronic skew compensator 610 can be implemented on all channels, or only on a fraction of the channels. Optional optical skew compensator 608 can be programmable to allow a variable amount of delay on the information transmitted thereon, with a bypass to reduce any incidental propagation delay that the device may exhibit even if no skew compensation is desired. Additionally, optional electronic skew compensator 610 may be located anywhere within the optical networking system, including at transmitting nodes, receiving nodes and intermediary nodes. After the appropriate buffering in the receiver, the electrical signals are communicated to switch 612, which can be any form of switch, such as cross-point switch, which enables rerouting of information signals from one channel, or wavelength, to another channel, or wavelength.

Referring specifically to FIG. 10, a schematic of a transmitter portion of a line module 600B is shown wherein the transmitter has optical skew compensation and electronic skew buffer in accordance with various aspects of the present invention. Transmitter receives the electrical signals 'A' from the receiver of FIG. 9 or alternatively from a client data source 640, such as an add channel. Transmitter portion of DLM 503A also has electrical domain portion 642 and optical domain portion 644, with respective optional optical skew buffer 646, and optional electronic skew compensator 648. DLM 503A can utilize any combination of these delay devices in the transmitter and receiver as is applicable for a given design or application depending on the level of skew variation exhibited in the network. Optional buffers for FIGS. 9 and 10 are dedicated, distributed in-line buffers in the present embodiment. However, in-line buffers can also be a centralized, shared memory buffer, albeit with latency, cost, and flexibility tradeoffs.

Figure 13:
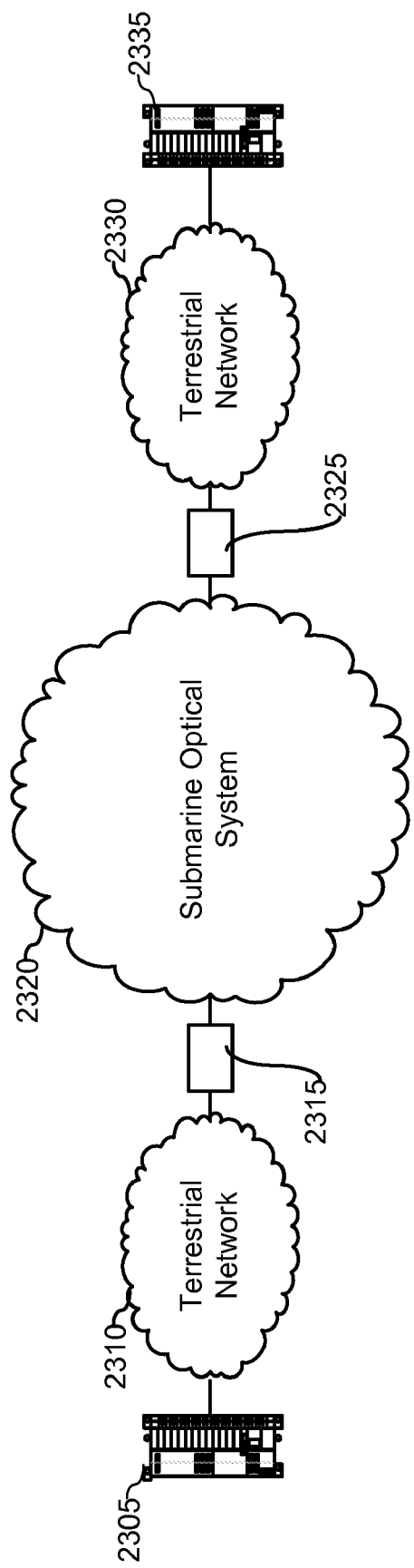
FIG. 13 is an optical system comprising both terrestrial and submarine optical networks according to various embodiments of the present invention.

Increased bandwidth that can be gained from co-routing signal portions as described can be particularly advantageous in submarine optical systems, for example, in communicating between continents where the communication spans large bodies of water. FIG. 13 illustrates an exemplary multi-network, trans-oceanic optical system in which skew compensation is realized at various locations along the signal path including pre-compensation, intermediary compensation, and post-compensation. In addition, the location and frequency of skew compensation modules may depend on the number and diversity of the service providers involved in the multi-network trans-oceanic system.

Various embodiments of the invention may be applied to submarine optical systems, some of which may be used as trans-oceanic optical networks that connect terrestrial systems across a large body of water. One skilled in the art will recognize that the length in which an optical signal travels on these trans-oceanic systems presents diverse engineering issues including both dispersion and skew compensation. These issues are further complicated as the data rate of a client signal increases and the total number of channels on which a signal is transmitted expands. One skilled in the art will recognize that the following discussion, although described in relation to a trans-oceanic optical system, may be applied to any type of networking system in which skew and latency management are relevant, such as long-haul terrestrial optical systems.

Figure 11:
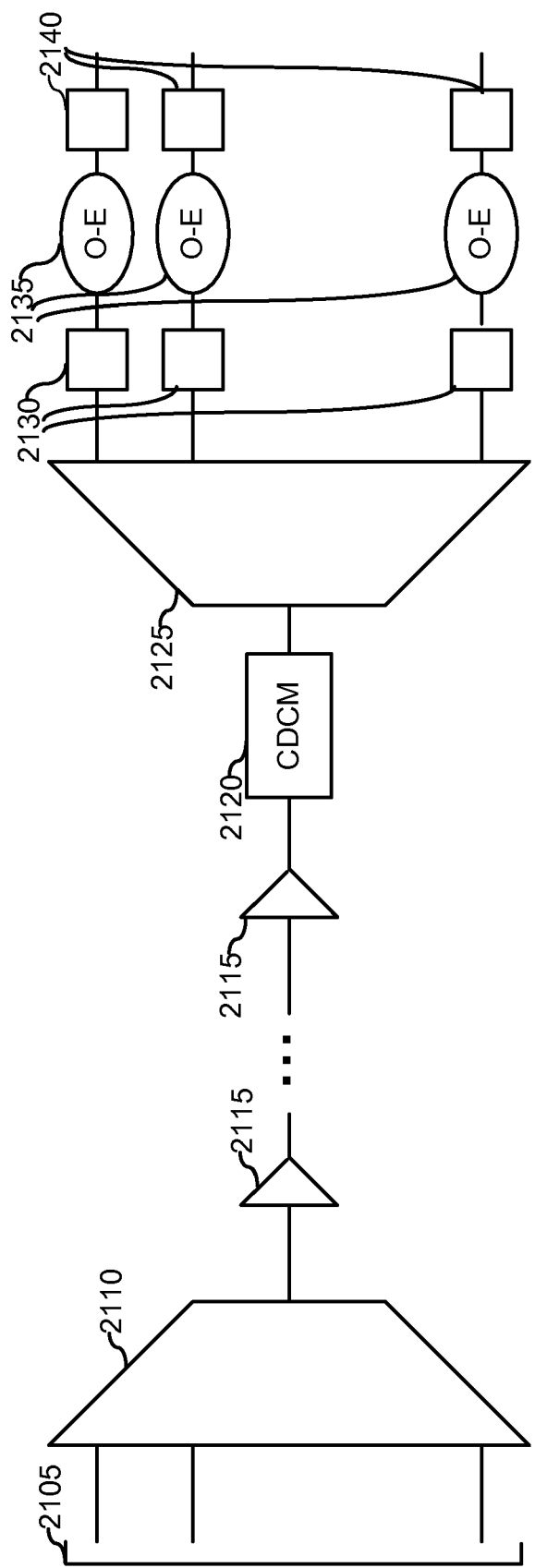
FIG. 11 is an optical system having both dispersion compensating elements and skew compensating elements according to various embodiments of the present invention.

FIG. 11 illustrates generally a system in which both dispersion and skew post-compensation are performed at a receiver side of an optical system according to various embodiments of the invention. It is important to note that the skew management functions and structures previously described above may be employed within this network at various locations. For example, the network may be installed, configured and managed at transmission nodes, intermediary nodes and/or receiver nodes to improve the differential latency between channels within the system.

On the transmission side of the system, a plurality of channels 2105 is optically multiplexed, via multiplexer 2110, to generate a WDM signal. The WDM signal is communicated along the optical span having multiple optical amplifiers or regenerators 2115 that keep the WDM signal power within a preferred range. A coarse dispersion compensation module 2120 is coupled to receive the WDM signal after having traversed all or substantially all of the optical span. The coarse dispersion compensation module 2120 compensates for dispersion effects on the WDM signal along the span, which causes signal degradation. In various embodiments of the invention, the coarse dispersion compensation module 2120 comprises dispersion compensating fiber or fibers that reduce the dispersive characteristics of the WDM signal. As the WDM travels through these dispersion compensating fiber (s), the shape of the signal is improved resulting in a better signal-to-noise ratio.

One skilled in the art will recognize that various compensating systems may be realized with different types and combinations of dispersion compensating fibers. Because the coarse dispersion compensation module 2120 compensates for dispersion across the channels of the WDM signal (i.e., the WDM signal is multiplexed), targeting certain channels within the WDM signal for dispersion compensation is difficult. Accordingly, certain embodiments of the invention provide for additional fine dispersion compensation at a channel granularity.

An optical demultiplexer 2125 separates the WDM signal into individual channels, optical signal groups, or a combination thereof. A plurality of fine dispersion compensation modules 2130 receive optical channels or optical signal groups and further apply dispersion compensation thereon. In certain embodiments of the invention, each fine dispersion compensation module 2130 is designed to compensate a certain channel or group of channels. Dispersion compensation fiber may be used within the plurality of fine dispersion compensation modules 2130.

The coarse dispersion compensation module 2120 and the fine dispersion compensation module 2130 introduce additional latency within the WDM signal. These latency effects become even more detrimental when the added latency is not spread evenly across each of the channels. In such situations, this uneven addition of latency further increases the amount of skew between one or more of the channels resulting in a more complex and demanding reassembly procedure if not address prior thereto.

Each of the dispersion compensated channels is converted into the electrical domain by a plurality of optical-to-electrical converters 2135. These converters 2135 may include PIN diodes, photoavalanche diodes, or other converters known to one of skill the art. The resulting electrical signals are provided to a plurality of skew compensating modules 2140 that adjust the differential latency between the channels so that a signal, transmitted across at least two of the channels, may be more efficiently rebuilt. This skew compensation may be achieved by effectively introducing additional latency within one or more of the channels by performing a post-buffering operation thereon. One skilled in the art will recognize that the buffer size in each of the skew compensating modules 2140 may be adjusted to enable compensation of more or less skew.

As previously discussed, skew is potentially introduced into a client signal as the channels within the WDM signal travel across the optical span and are processed within dispersion compensation modules (e.g., 2120, 2130). This skew may be compensated on the transmission side of the optical signal by pre-buffering one or more of the channels within the WDM signal, by buffering one or more of the channels within the WDM signal at an intermediary node, or post-buffering one or more of the channels at the skew compensating modules 2140, or any combination thereof. According to various embodiments of the invention, the skew compensating modules 2140 may also provide skew analysis functionality in which skew across the channels is monitored. If the skew falls outside of a desired range, a skew compensating module 2140 may generate an alarm and/or dynamically re-allocate the channels to improve the skew. Furthermore, as detailed in FIG. 12, the skew compensating modules 2140 may also be divided into coarse and fine skew compensating modules.

Although skew compensation has been described as being performed in the electrical domain, one skilled in the art will recognize that skew compensation may also be done in the optical domain. For example, additional latency may be added to one or more channels by using an optical buffer, such as a fiber coil, to add this latency.

Figure 12:
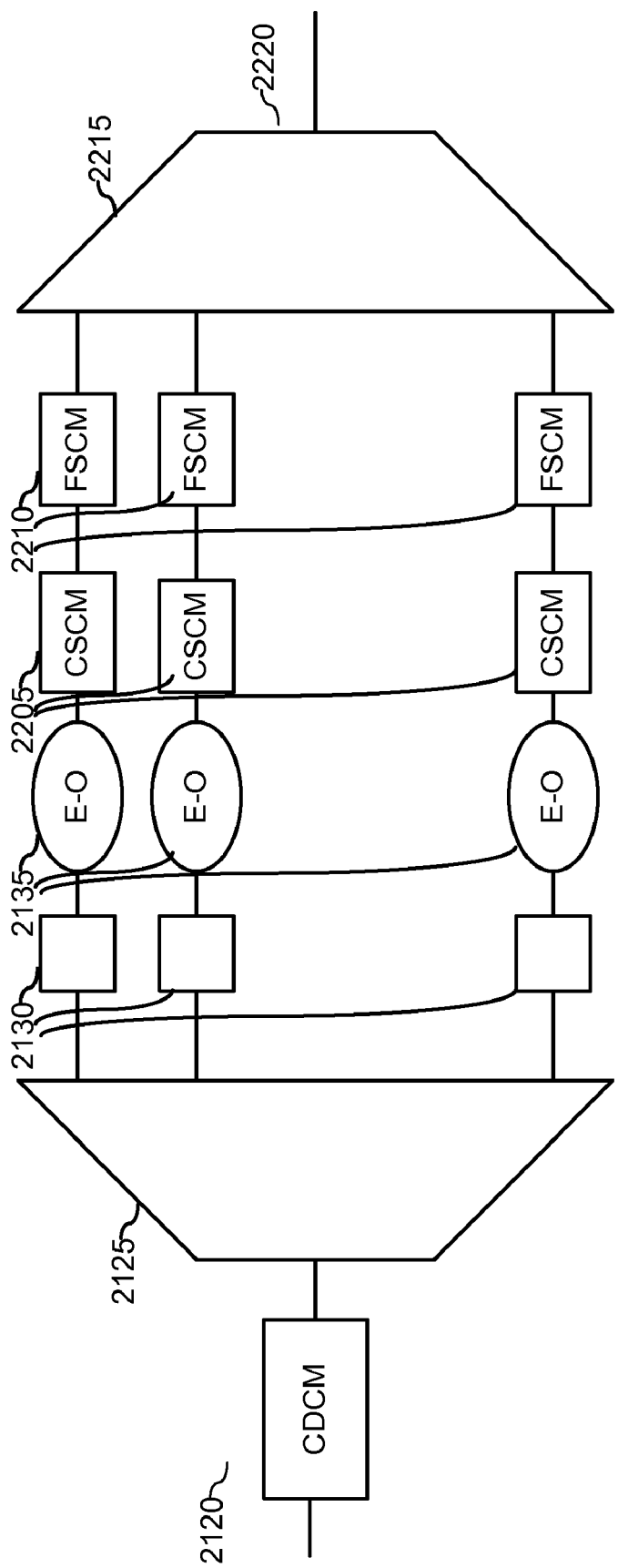
FIG. 12 is an optical receiver system in which dispersion and skew compensation is performed according to various embodiments of the present invention.

FIG. 12 illustrates a more detailed diagram of a receiver node within a trans-oceanic optical system according to various embodiments of the invention. The node comprises a coarse dispersion compensation module 2120 that compensates dispersion across the WDM signal as previously discussed. An optical demultiplexer 2125 optically separates the WDM signal into individual channels or optical signal groups, after which a plurality of fine dispersion compensation modules refine the dispersion compensation at a finer granularity. After being converted into electrical channels by converters 2135, the skew across the electrical channels is first coarsely adjusted and then finely adjusted.

In various embodiments of the invention, the electrical channels are provided to a plurality of coarse skew compensating modules 2205. These modules 2205 provide a coarse adjustment of differential latency between at least two of the electrical channels. This reduction of differential latency may be achieved by buffering one or more of the electrical channels for a set period of time, which effectively reduces the corresponding skew or differential latency between the electrical channels. A plurality of fine skew compensating modules 2210 further refines the skew compensation across certain channels. In certain embodiments of the invention, the plurality of fine skew compensating modules 2210 analyze certain skew characteristics remaining after the coarse skew adjustment and further adjust the channels to further improve the corresponding skew. One skilled in the art will recognize that either or both of the coarse skew compensating modules 2210 and the fine skew compensating modules 2215 may be integrated with other electrical components within the node. For example, the fine skew compensating modules 2215 may be integrated within an electrical multiplexer 2215 that combines one or more electrical channels into a client signal.

Further electrical components or modules may be provided within the signal paths that analyze, modify or otherwise process these compensated electrical channels. These electrical components may or may not be located between the coarse skew compensating modules 2210 and the fine skew compensating modules 2215.

Using the compensated electrical signals, a client signal 2220 is transmitted from the electrical multiplexer 2215 and is generated by combining one or more of the electrical signals into a relatively higher data rate signal. This combination of electrical signals is less demanding if there is little or no skew between its component electrical channels.

FIG. 13 illustrates an exemplary multi-network, trans-oceanic optical system in which skew compensation is realized at various locations along the signal path including pre-compensation, intermediary compensation, and post-compensation. In addition, the location and frequency of skew compensation modules may depend on the number and diversity of the service providers involved in the multi-network trans-oceanic system.

Referring to FIG. 13, a transmitting node 2305 transmits and/or receives information from a first terrestrial network 2310. A first landing node 2315 interfaces the first terrestrial network 2310 with a submarine optical system 2320. A second landing node 2325 interfaces the submarine optical system 2320 with a second terrestrial network 2330, which is connected to a receiver node 2335. In this type of system, skew compensation may be realized at various locations including the transmitting node 2305, the first landing node 2315, the second landing node 2325, and the receiver node 2335.

In various embodiments of the invention, pre-skew compensation is performed exclusively on the transmitting node 2305, which compensates for skew across the first terrestrial network 2310, the submarine optical system 2320, and the second terrestrial network 2330. These embodiments may be more typical if a service provider is using a third-party submarine optical system to inter-connect terrestrial networks and does not have control of the landing nodes of the submarine optical system.

In other embodiments, skew compensation may be diversified throughout the system in which the first and/or second landing nodes 2315, 2325 further comprise skew compensation modules. Such a diversification allows a relatively lower amount of pre-compensation to be performed on the transmitting node 2305 and a relatively lower amount of post-compensation to be performed on the receiver node 2335. Additionally, this diversification may also provide early fault or error detection if skew becomes too large at some point within the system.

Network planning using skew considerations can also be utilized when performing a protection switching function. Protection switching occurs when there is a break in a fiber, for example, when a fiber has been severed by a backhoe or other piece of equipment. Protection switching can also occur when there is sufficient degradation in the signal to approximate a broken fiber. When a protection switch event occurs, the centralized or distributed controller determines an alternate path for the signal that would otherwise be transported on the broken fiber.

Figure 14:
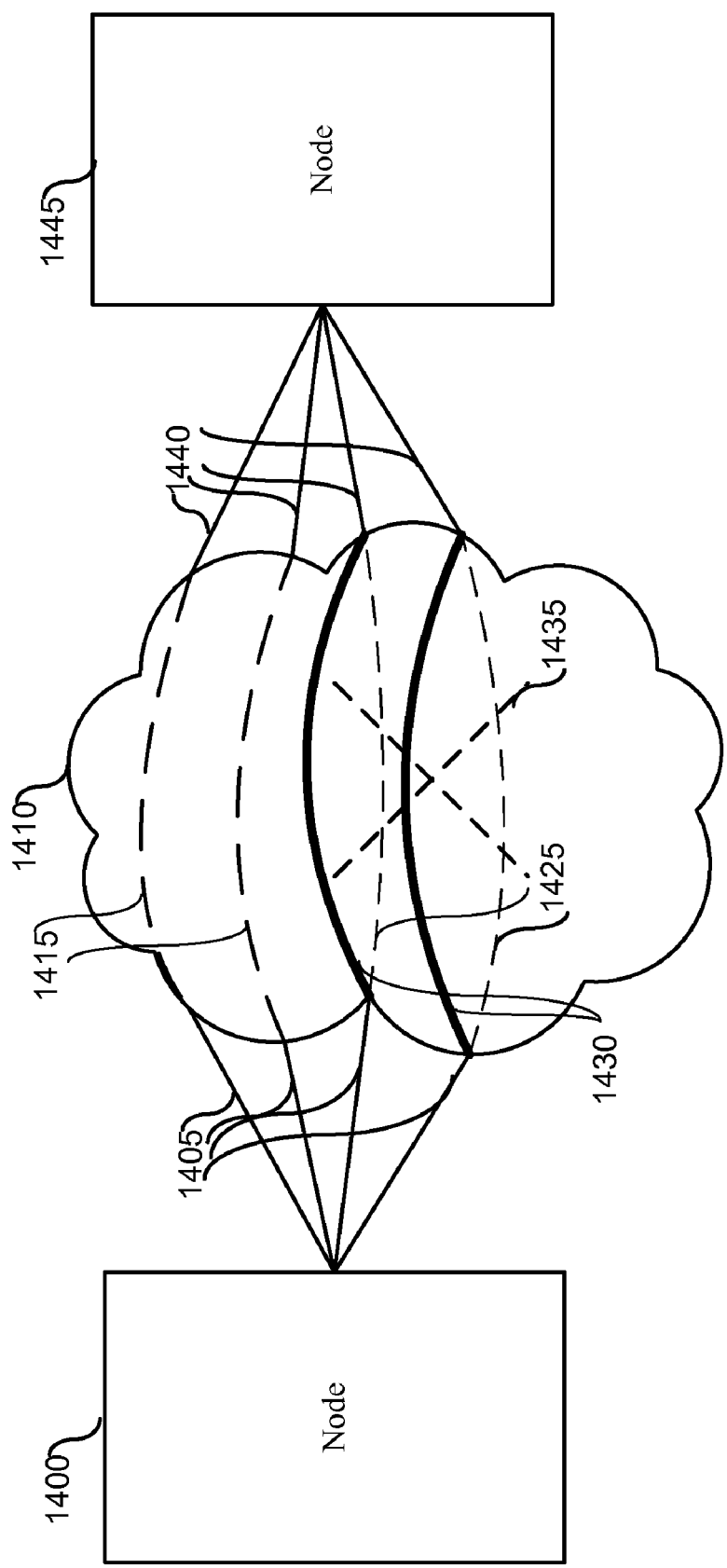
FIG. 14 is a block diagram of a communication network that transmits a signal over multiple channels and performs protection switching considering skew information for routing the multiple channels, in accordance with various aspects of the present invention.

FIG. 14 shows a block diagram of one embodiment of the present invention performing a protection switching operation. FIG. 14 illustrates a signal transporting between nodes 1400 and 1445 through network cloud 1410. In the example shown, the signal is divided into four portions that are transported on four paths 1405. Two of the four paths 1415 are transported on fibers that are intact. The other two channels 1425 are transported on a fiber or fibers are have been compromised due to breakage or signal loss for another reason. In one embodiment, paths 1425 are re-routed on paths 1430 to node 1445 taking into consideration skew between paths 1415 and 1430. Paths 1415 and 1430 may be, but are not required to be, on the same fiber. Any or all of the above described skew determination and skew compensation techniques may be used in conjunction with this protection switching operation.

The networking system can detect a failure resulting in the need for a protection switching operation using either conventional methods or using the latency and skew determinations described above. In some embodiments using empirically determined skew data, the networking system can detect a failure based on skew because the skew will grow unacceptably large as a result of a failure. Consequently, the skew will be outside of the skew constraints requiring the system to select an alternate path or paths. Alternatively, conventional methods of failure detection can be used. Once a failure has been detected the signal will be rerouted to avoid the failure. When the signal is rerouted, the system can take into consideration the skew on the newly selected paths and route the signal accordingly as described above.

Figure 15:
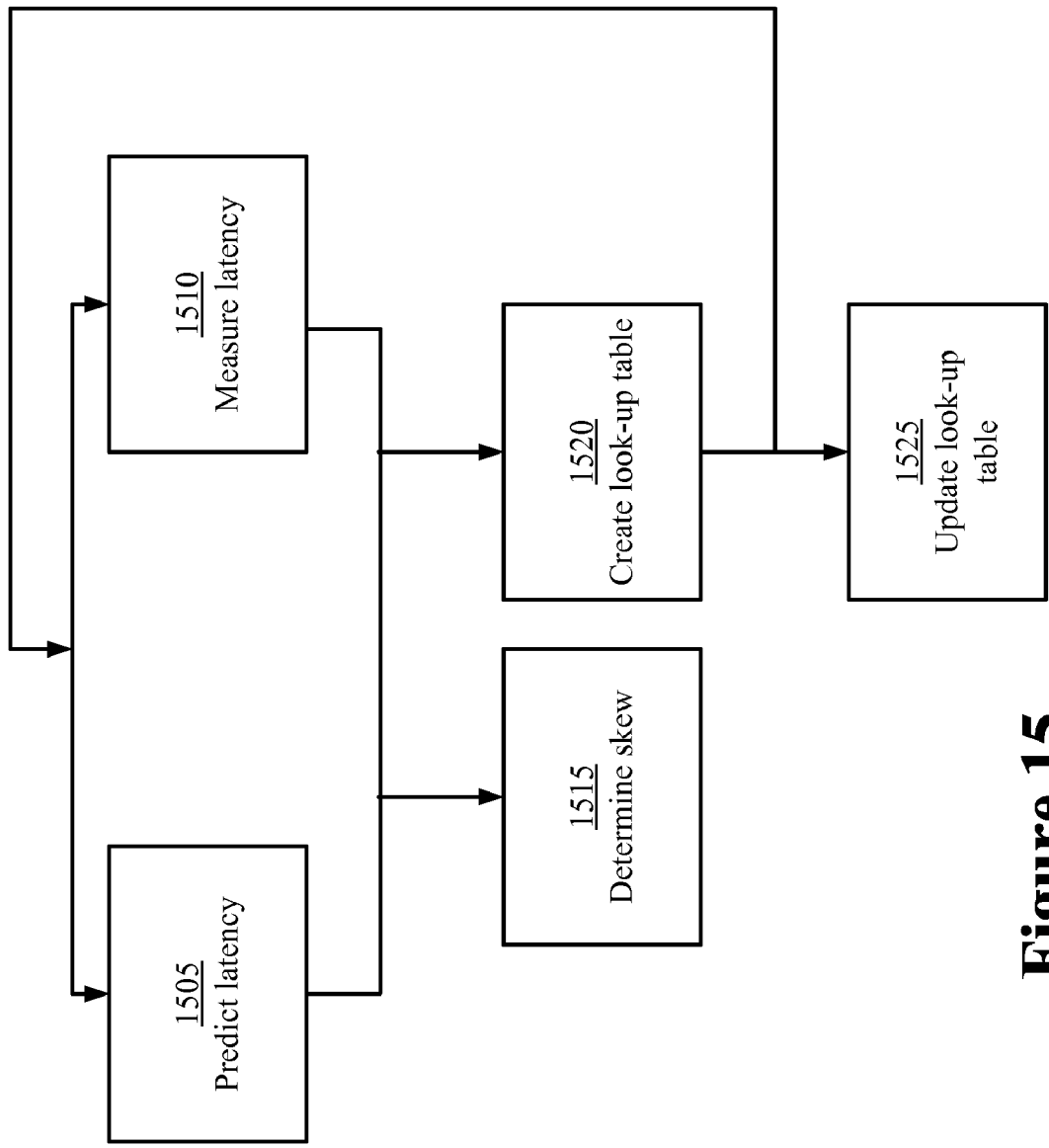
FIG. 15 is a flow chart illustrating creation and maintenance of latency look-up table.
Figure 16:
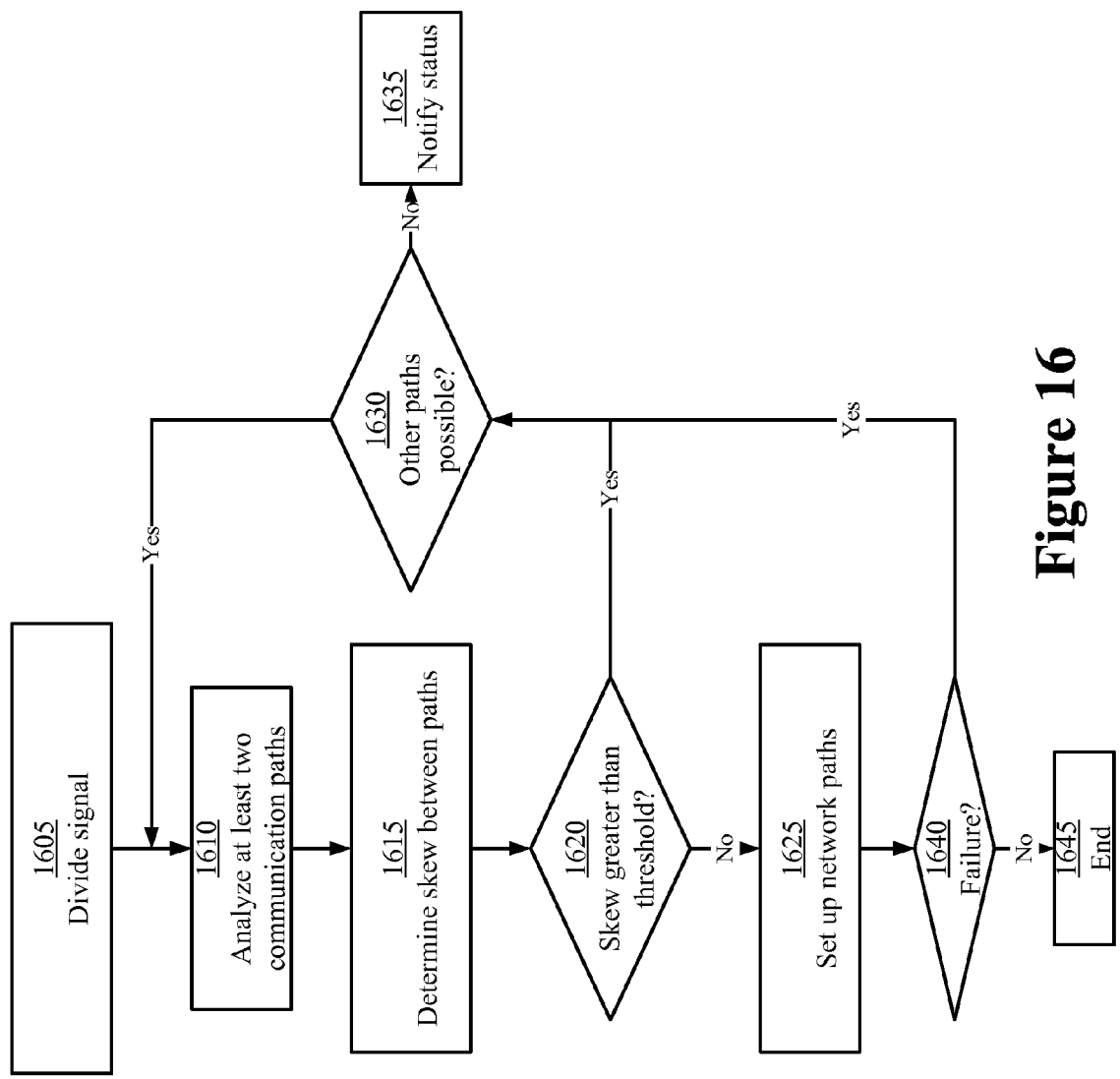
FIG. 16 is a flow chart illustrating routing selections considering skew.

FIGS. 15 and 16 are flowcharts illustrating processes, independent of structure for creating and updating look-up table 234 and for setting up network paths taking into consideration skew. Referring to FIG. 15, latency can be predicted 1505, latency can be measured 1510 or a combination thereof, as described above in reference to FIG. 3. The latency can be used to determine skew 1515 as described above in reference to FIG. 3. Also, the latency values can be used to create a look-up table 1520 or can be stored in another format. Once the table has been created 1520, the latency values can be measured 1510 and the table updated real time 1525. The table can be updated 1525 before there is network traffic, while there is network traffic, or after network traffic.

FIG. 16 illustrates a process for setting up network paths in accordance with one embodiment. FIG. 16 assumes that the network will be transporting information as two or more signal portions over two or more communication paths.

Therefore, the signal is divided 1605 into those two more signal portions. At least two paths are analyzed as possible communication paths for the two or more signal portions 1610. As part of the analysis the skew between the paths is determined 1615. The skew is compared to a skew threshold 1620. If the skew is less than the skew threshold, the network paths can be used 1625. The paths can also be analyzed for a failure event 1640. If there has not been a failure then the paths can continue to be used and the process is complete 1645.

If the skew between the first two paths analyzed is greater than the skew threshold, then other paths will be analyzed if there are other paths available 1630. If there are no other paths available, then a notification is sent indicating that the signal cannot be sent as two signal portions 1635. One skilled in the art will understand that although the above process is described in regard to two communication paths, more than two paths can also be analyzed.

One skilled in the art will recognize that the above-described method for calculating latency across diverse paths may be applied to any number of paths greater than two. Additionally, the method may be applied to any type of network including, but not limited to, submarine, trans-oceanic optical systems.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

We claim:

1. A networking system, comprising:
 a transmission node that outputs a first portion of a signal on a first one of a plurality of channels and a second portion of the signal on a second one of the plurality of channel;
 an initialization module, coupled within the networking system, that selects a first path, among a plurality of paths in the networking system, such that the first channel is transmitted on the first path, and a second path, among the plurality of paths in the networking system, such that the second channel is transmitted on the second path, the first and second paths being selected by the initialization module based at least in part on a skew relative to the first path and the second path; and
 a receiver node that receives the first and second portions of the signal and assembles the signal to include the first and second portions.

2. The networking system of claim 1 wherein the initialization module predicts the skew between the first path and the second path.

3. The networking system of claim 1, further including a look-up table, wherein the latency is stored in the look-up table.

4. The networking system of claim 1 wherein the latency is calculated based on transport characteristics of the networking system.

5. The networking system of claim 1 wherein the skew is measured by measuring latency of the first path and latency of the second path.

6. The networking system of claim 1 wherein the receiver node includes a buffer that compensates the skew between the first and second communication paths.

7. The networking system of claim 1 wherein the initialization module compares the skew to a determined skew threshold.

8. The networking system of claim 7 further comprising a notification module, coupled within the networking system, to transmit a notification to the initialization module that the skew exceeds the skew threshold.

9. The networking system of claim 7 wherein the initialization module indentifies a third communication path when the skew exceeds the skew threshold.

10. The networking system of claim 1 further comprising a protection switching module that performs a protection switch.

11. The networking system of claim 1 wherein the first and second communication paths are at least partially over a degradable optical medium.

12. The networking system of claim 1 further comprising a monitor module that monitors the skew between the first and second paths.

13. The networking system of claim 1 wherein the initialization module is coupled within the transmission node and the receiver node.

14. The networking system of claim 1 wherein the networking system is a submarine system.

15. The networking system of claim 1 wherein the networking system is a terrestrial system.

16. The networking system of claim 1 wherein each channel is transported on a carrier wavelength.

17. The networking system of claim 1 wherein the first and second paths include first and second fibers, respectively.

18. A transceiver that determines a communication path, the transceiver comprising:
   an input on which a signal is received;
   a deinterleaver, coupled to the input, that partitions the signal into a first signal portion and a second signal portion; and
   a controller, coupled to the deinterleaver, that determines a first communication path for transmission of the first signal portion and a second communication path for transmission of the second signal portion, the controller selecting the first and second communication paths based, at least in part, on a skew between the first and second communication paths.

19. The transceiver of claim 18 further comprising a notification module that notifies a user of the transceiver when the skew between the first and the second communication paths exceeds a predetermined value.

20. The transceiver of claim 18 further comprising a monitor module that monitors the skew between the first and second communication paths.

21. A method for routing a signal over a plurality of channels, the method comprising:
   selecting a first communication path from among a plurality of communication paths for transmitting a first portion of the signal over at least one of the plurality of channels; and
   selecting a second communication path from among the plurality of communication paths for transmitting a second portion of the signal over at least one of the plurality of channels, said selecting the first communication path and selecting the second communication path being based on a skew between the first and second communication paths;
   transmitting the first channel carrying the first portion of the signal on the first communication path; and
   transmitting the second channel carrying the second portion of the signal on the second communication path.

22. The method of claim 21 wherein the first and second communication paths are include the same transport optical medium.

23. The method of claim 21 wherein the first and second communication paths include the first and second optical media, respectively.

24. The method of claim 21 further comprising recombining the first and second signal portions at a receiver node.

25. The method of claim 21 further comprising performing a protection switching operation based on the skew between the first and second communication paths.

26. The method of claim 21 further comprising storing a value related to the skew in a table.

27. The method of claim 26 further comprising updating the value related to skew in the table.

28. The method of claim 21 further comprising maintaining a value related to the skew in a non-tabular format.

29. The method of claim 21 further comprising performing a compensation operation to compensate for skew between the first and second communication paths.

30. The method of claim 21 further comprising seeking identifying a third communication path when the skew exceeds the skew threshold.

* * * * *